United States Patent
Kikuchi et al.

(10) Patent No.: US 9,289,722 B2
(45) Date of Patent: Mar. 22, 2016

(54) HONEYCOMB STRUCTURE AND MANUFACTURING METHOD OF THE SAME

(71) Applicant: NGK Insulators, Ltd., Nagoya (JP)

(72) Inventors: Yoshio Kikuchi, Nagoya (JP); Takashi Suzuki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 5 days.

(21) Appl. No.: 14/187,867

(22) Filed: Feb. 24, 2014

(65) Prior Publication Data

US 2014/0294692 A1   Oct. 2, 2014

(30) Foreign Application Priority Data

Mar. 29, 2013   (JP) .................... 2013-075371

(51) Int. Cl.
*B01D 39/06* (2006.01)
*B01D 39/20* (2006.01)
(Continued)

(52) U.S. Cl.
CPC ............... *B01D 53/86* (2013.01); *B32B 18/00* (2013.01); *C04B 35/565* (2013.01); *C04B 35/6316* (2013.01); *C04B 35/645* (2013.01); *F01N 3/2828* (2013.01); *B01D 46/2425* (2013.01); *C04B 2235/3206* (2013.01); *C04B 2235/3208* (2013.01); *C04B 2235/3481* (2013.01); *C04B 2235/3834* (2013.01); *C04B 2235/3891* (2013.01); *C04B 2235/428* (2013.01); *C04B 2235/5409* (2013.01); *C04B 2235/5436* (2013.01); *C04B 2235/5445* (2013.01); *C04B 2235/5472* (2013.01); *C04B 2235/658* (2013.01); *C04B 2235/6581* (2013.01); *C04B 2235/661* (2013.01); *C04B 2235/663* (2013.01);

(Continued)

(58) Field of Classification Search
CPC ... B01D 46/0063; F01N 3/2012; F01N 3/027; F01N 3/2026; F01N 2240/16
See application file for complete search history.

(56) References Cited

U.S. PATENT DOCUMENTS 4,765,930 A * 8/1988 Mashimo et al. ............. 252/511
5,200,154 A * 4/1993 Harada et al. ................ 422/174
(Continued)

FOREIGN PATENT DOCUMENTS

EP   2 374 773 A1   10/2011
JP   2010-229976    10/2010
(Continued)

OTHER PUBLICATIONS

U.S. Appl. No. 14/187,752, filed Feb. 24, 2014, Kikuchi et al.
(Continued)

*Primary Examiner* — Amber R Orlando
(74) *Attorney, Agent, or Firm* — Burr & Brown, PLLC

(57) ABSTRACT

A honeycomb structure includes a tubular honeycomb structure body having porous partition walls to define and form a plurality of cells, and an outer peripheral wall; and a pair of electrode sections disposed on a side surface of the honeycomb structure body, an electrical resistivity of the honeycomb structure body is from 1 to 200 Ωcm, each of the pair of electrode sections is formed into a band shape extending in an extending direction of the cells, the electrode section is constituted of a porous body in which particles made of silicon carbide as an aggregate are bound by a binding material, silicon carbide as the aggregate constituting the electrode sections contains β-SiC having a stacking fault of 2% or less, and the binding material constituting the electrode sections contains silicon and a metal silicide.

18 Claims, 2 Drawing Sheets

(51) Int. Cl.

| | |
|---|---|
| B01D 39/14 | (2006.01) |
| B01D 24/00 | (2006.01) |
| B01D 50/00 | (2006.01) |
| B01D 53/86 | (2006.01) |
| F01N 3/28 | (2006.01) |
| C04B 35/645 | (2006.01) |
| B32B 18/00 | (2006.01) |
| C04B 35/565 | (2006.01) |
| C04B 35/63 | (2006.01) |
| B01D 46/24 | (2006.01) |

(52) U.S. Cl.
CPC ..... *C04B2235/762* (2013.01); *C04B 2235/785* (2013.01); *C04B 2235/786* (2013.01); *C04B 2237/365* (2013.01); *C04B 2237/86* (2013.01)

(56) References Cited

U.S. PATENT DOCUMENTS

| | | | | |
|---|---|---|---|---|
| 5,229,079 | A * | 7/1993 | Harada et al. | 422/174 |
| 5,245,825 | A * | 9/1993 | Ohhashi et al. | 60/300 |
| 5,259,190 | A * | 11/1993 | Bagley et al. | 60/300 |
| 5,492,752 | A * | 2/1996 | Parsons et al. | 428/212 |
| 5,597,744 | A * | 1/1997 | Kamiyama et al. | 438/285 |
| 5,876,787 | A * | 3/1999 | Avarbz et al. | 427/79 |
| 8,158,908 | B2 * | 4/2012 | Konieczny et al. | 219/202 |
| 2005/0067672 | A1 * | 3/2005 | Toyoda et al. | 257/565 |
| 2009/0155527 | A1 * | 6/2009 | Kawai et al. | 428/116 |
| 2010/0229629 | A1 * | 9/2010 | Egami et al. | 73/28.01 |
| 2012/0003420 | A1 * | 1/2012 | Betsushiyo et al. | 428/116 |
| 2012/0076698 | A1 * | 3/2012 | Ishihara | 422/174 |
| 2012/0076699 | A1 * | 3/2012 | Ishihara | 422/174 |
| 2012/0187109 | A1 | 7/2012 | Noguchi et al. | |
| 2013/0036719 | A1 | 2/2013 | Noguchi et al. | |
| 2013/0043237 | A1 | 2/2013 | Sakashita et al. | |

FOREIGN PATENT DOCUMENTS

| | | |
|---|---|---|
| JP | 2012-233443 A1 | 11/2012 |
| WO | 2011/043434 | 4/2011 |
| WO | 2011/105567 | 9/2011 |
| WO | 2011/125817 | 10/2011 |

OTHER PUBLICATIONS

Won-Seon Seo et al., "*Effects of Additives on the Stacking Fault Annihilation in β-SiC Powder Compacts,*" Journal of the Ceramic Society of Japan, 1991, vol. 99, No. 12, pp. 1179-1184.

Naoto Shirahata, et al., "*Thermal Stability of Stacking Faults in β-SiC Specimens,*" Journal of the Ceramic Society of Japan, 1998, vol. 106, No. 5, pp. 483-487.

Waseda Yoshio, et al., "*X-ray Structure Analysis Determine Atomic Arrangement (Material Science Series)*", Uchida Rokakuho Publishing Co., Ltd., Sep. 30, 1999, Second Version issued, pp. 119 to 123.

Shigeo Hayashi et al., "*Accuracy in the Quantitative Phase Analysis of Eight- to Ten-Component Ceramic Materials Using the Whole-Powder-Pattern Fitting Methods,*" Journal of the Ceramic Society of Japan, 1999, vol. 107, No. 3, pp. 249-257.

U.S. Appl. No. 14/187,752, filed Feb. 24, 2014.

Extended European Search Report (Application No. 14159747.6) dated Sep. 30, 2014.

* cited by examiner

HONEYCOMB STRUCTURE AND MANUFACTURING METHOD OF THE SAME

The present application is an application based on JP 2013-075371 filed on Mar. 29, 2013 with the Japanese Patent Office, the entire contents of which are incorporated herein by reference.

BACKGROUND OF THE INVENTION

1. Field of the Invention

The present invention relates to a honeycomb structure, and a manufacturing method of the honeycomb structure. More particularly, it relates to a honeycomb structure which is a catalyst carrier and also functions as a heater when a voltage is applied thereto, and a manufacturing method of the honeycomb structure.

2. Description of Related Art

Heretofore, a honeycomb structure of cordierite onto which a catalyst is loaded has been used in a treatment of harmful substances in an exhaust gas discharged from a car engine. Moreover, it is known that a honeycomb structure formed of a sintered body of silicon carbide is used in purification of the exhaust gas. When the exhaust gas is treated by the catalyst loaded onto the honeycomb structure, it is necessary to raise a temperature of the catalyst to a predetermined temperature. However, at start of the engine, the catalyst temperature is low, which has caused the problem that the exhaust gas cannot sufficiently be purified.

Thus, there has been suggested a honeycomb structure which is a catalyst carrier and also functions as a heater when a voltage is applied thereto (e.g., see Patent Documents 1 to 4).

In Patent Documents 1 to 3, there is disclosed a honeycomb structure including a tubular honeycomb structure body, and a pair of electrode sections disposed on a side surface of this honeycomb structure body. The honeycomb structure body has porous partition walls to define and form a plurality of cells, and an outer peripheral wall. In Patent Document 1, it is described that a volume electrical resistivity of the honeycomb structure body at 400° C. is from 1 to 40 Ωcm, and a volume electrical resistivity of the electrode sections at 400° C. is 40% or less of the volume electrical resistivity of the honeycomb structure body. In Patent Document 2, electrode sections containing silicon (Si) and silicon carbide (SiC) are described. In the electrode sections of Patent Document 2 an average particle diameter of silicon carbide particles is from 10 to 70 μm, and a ratio (Si/SiC) of a mass between silicon (Si) and silicon carbide (SiC) is from 20/80 to 50/50. Furthermore, in Patent Document 3, it is described that in a cross section perpendicular to a cell extending direction, an angle of 0.5 times a central angle of each electrode section is from 15 to 65°. Further, in Patent Document 3, it is described that each electrode section is formed to be thinner from a central portion in a peripheral direction of the honeycomb structure body toward both ends in the peripheral direction, in the cross section perpendicular to the cell extending direction. Further, in Patent Document 4, there is disclosed a honeycomb body for energization heat generation made of a conductive material, and including a plurality of through holes which are divided by partition walls and are substantially parallel to a gas flow direction, and both end surfaces on a gas inflow side and a gas outflow side. This honeycomb body for energization heat generation further includes electrode sections having a low volume resistivity and a heat generating section having a high volume resistivity, and the electrode sections are formed on both the whole end surfaces. Furthermore, in this honeycomb body for energization heat generation, the volume resistivity of the heat generating section is from 0.1 to 10 Ωcm, and the volume resistivity of the electrode sections is ¹/₁₀ or less of the volume resistivity of the heat generating section.

[Patent Document 1] WO 2011/043434
[Patent Document 2] WO 2011/105567
[Patent Document 3] WO 2011/125817
[Patent Document 4] JP-A-2010-229976

SUMMARY OF THE INVENTION

However, in a honeycomb structure which also functions as a conventional heater, a current does not easily flow evenly through a honeycomb structure body, which has caused the problem that a portion which is not easily heated is created in the honeycomb structure body. That is, in the conventional honeycomb structure, a resistance of electrode sections is not sufficiently low as compared with the honeycomb structure body, and hence a current supplied from a predetermined power source to the electrode sections disadvantageously preferentially flows from a portion close to a position to which the current has been supplied to the honeycomb structure body sometimes before the current is transmitted to all regions of the electrode sections. As a result, in the honeycomb structure body, heat is noticeably generated in a portion through which the current preferentially flows, whereas the heat is not sufficiently generated in a portion through which the current does not easily flow. In this way, temperature unevenness (i.e., heat generation unevenness) occurs in the conventional honeycomb structure which also functions as the heater sometimes during the heat generation.

The present invention has been developed in view of the above-mentioned problems, and an object thereof is to provide a honeycomb structure which is a catalyst carrier and also functions as a heater when a voltage is applied thereto, and which can further lower an electrical resistivity of electrode sections and decrease temperature unevenness during heat generation.

To achieve the above-mentioned object, according to the present invention, there are provided the following honeycomb structure and the following manufacturing method of the honeycomb structure.

According to a first aspect of the present invention, a honeycomb structure including a tubular honeycomb structure body having porous partition walls to define and form a plurality of cells as through channels of a fluid which extend from a first end surface as one end surface to a second end surface as the other end surface, and an outer peripheral wall positioned on the outermost periphery is provided; and a pair of electrode sections disposed on a side surface of the honeycomb structure body, wherein an electrical resistivity of the honeycomb structure body is from 1 to 200 Ωcm, each of the pair of electrode sections is formed into a band shape extending in an extending direction of the cells of the honeycomb structure body, in a cross section perpendicular to the extending direction of the cells, the one electrode section in the pair of electrode sections is disposed on a side opposite to the other electrode section in the pair of electrode sections via the center of the honeycomb structure body, the electrode section is constituted of a porous body in which particles made of silicon carbide as an aggregate are bound by a binding material, silicon carbide as the aggregate constituting the electrode section contains β-SiC having a stacking fault of 2% or less, and the binding material constituting the electrode section contains silicon and a metal silicide.

According to a second aspect of the present invention, the honeycomb structure according to the above first aspect is provided, wherein a crystallite size of the β-SiC is 900 Å or more.

According to a third aspect of the present invention, the honeycomb structure according to the above first or second aspects is provided, wherein silicon carbide as the aggregate contains 40 vol % or more of β-SiC having the stacking fault of 2% or less.

According to a fourth aspect of the present invention, the honeycomb structure according to any one of the above first to third aspects is provided, wherein a ratio (the binding material/silicon carbide) of a volume of the binding material to a volume of silicon carbide as the aggregate is from 20/80 to 60/40.

According to a fifth aspect of the present invention, the honeycomb structure according to any one of the above first to fourth aspects is provided, wherein an average particle diameter of the particles made of silicon carbide as the aggregate is from 10 to 70 μm.

According to a sixth aspect of the present invention, the honeycomb structure according to any one of the above first to fifth aspects is provided, wherein the metal silicide to be contained in the binding material is a metal silicide of at least one selected from the group consisting of nickel and zirconium.

According to a seventh aspect of the present invention, the honeycomb structure according to any one of the above first to sixth aspects is provided, wherein a ratio of a volume of the metal silicide to a total volume of silicon carbide as the aggregate and the binding material is from 1 to 10 vol %.

According to an eighth aspect of the present invention, the honeycomb structure according to any one of the above first to seventh aspects is provided, wherein the electrode section further contains an alkaline earth metal oxide, $Al_2O_3$, and $SiO_2$.

According to a ninth aspect of the present invention, the honeycomb structure according to the above eighth aspect is provided, wherein the alkaline earth metal oxide is MgO.

According to a tenth aspect of the present invention, the honeycomb structure according to the above eighth or ninth aspects is provided, wherein the electrode section contains the alkaline earth metal oxide, $Al_2O_3$, and $SiO_2$ as much as 1 to 10 parts by volume in total, when a total volume of silicon carbide as the aggregate and the binding material is 100 parts by volume.

According to an eleventh aspect of the present invention, the honeycomb structure according to any one of the above first to tenth aspect is provided, wherein a thickness of the electrode section is from 50 to 300 μm.

According to a twelfth aspect of the present invention, the honeycomb structure according to any one of the above first to eleventh aspects is provided, wherein a porosity of the electrode section is from 10 to 60%.

According to a thirteenth aspect of the present invention, the honeycomb structure according to any one of the above first to twelfth aspects is provided, wherein n-SiC having the stacking fault of 2% or less which is to be contained in silicon carbide as the aggregate is obtained by using silicon, a carbonaceous substance, and a transition metal to form the silicon into silicon carbide.

According to a fourteenth aspect of the present invention, a manufacturing method of a honeycomb structure including an electrode section forming step of applying an electrode section forming raw material to each of a first region and a second region of a side surface of a tubular honeycomb formed body having partition walls to define and form a plurality of cells as through channels of a fluid which extend from a first end surface as one end surface to a second end surface as the other end surface is provided, and an outer peripheral wall positioned on the outermost periphery, or a fired honeycomb body obtained by firing the honeycomb formed body, and drying and firing the applied electrode section forming raw material, to form a pair of electrode sections, wherein in the electrode section forming step, the electrode section forming raw material is applied so that in a cross section perpendicular to an extending direction of the cells of the honeycomb formed body or the fired honeycomb body, the first region is positioned on a side opposite to the second region via the center of the honeycomb formed body or the fired honeycomb body, the electrode section forming raw material includes particles made of silicon carbide as an aggregate and a metal silicide as a binding material, and particles made of silicon which becomes a binding material, and silicon carbide as the aggregate contains β-SiC having a stacking fault of 2% or less.

According to a fifteenth aspect of the present invention, the manufacturing method of the honeycomb structure according to the above fourteenth aspect is provided, wherein β-SiC having the stacking fault of 2% or less which is to be contained in silicon carbide as the aggregate is obtained by using an aggregate material including silicon, a carbonaceous substance, and a transition metal.

According to a sixteenth aspect of the present invention, the manufacturing method of the honeycomb structure according to the above fifteenth aspect is provided, wherein the carbonaceous substance to be included in the aggregate material is carbon black.

According to a seventeenth aspect of the present invention, the manufacturing method of the honeycomb structure according to the above fifteenth or sixteenth aspects is provided, wherein the transition metal to be included in the aggregate material is at least one selected from the group consisting of nickel and zirconium.

According to an eighteenth aspect of the present invention, the manufacturing method of the honeycomb structure according to any one of the above fifteenth to seventeenth aspects is provided, wherein the silicon to be included in the aggregate material is a particulate material having an average particle diameter of 50 μM or more.

In a honeycomb structure of the present invention, silicon carbide as an aggregate constituting electrode sections contains β-SiC having a stacking fault of 2% or less, and a binding material constituting the electrode sections contains silicon and a metal silicide. According to this constitution, an electrical resistivity of the electrode sections can be lower than that of electrode sections of a conventional honeycomb structure. In consequence, a current supplied to one electrode section in the pair of electrode sections is suitably transmitted to the whole region of the electrode section, so that the current evenly flows from the electrode section to the whole honeycomb structure body. Therefore, as compared with the conventional honeycomb structure which also functions as a heater, temperature unevenness during heat generation, in other words, heat generation unevenness can be decreased.

DETAILED DESCRIPTION OF THE INVENTION

Next, modes for carrying out the present invention will be described in detail with reference to the drawings. However, it should be understood that the present invention is not limited to the following embodiments and that design changes, improvements and the like are suitably added on the basis of ordinary knowledge of a person skilled in the art without departing from the gist of the present invention.

Figure 1:
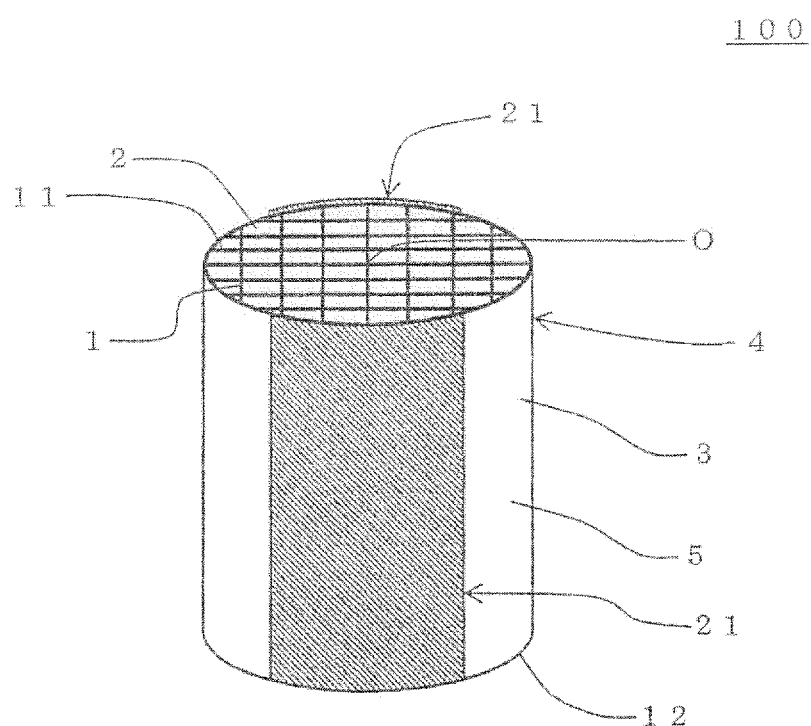
FIG. 1 is a perspective view schematically showing one embodiment of a honeycomb structure of the present invention.
Figure 2:
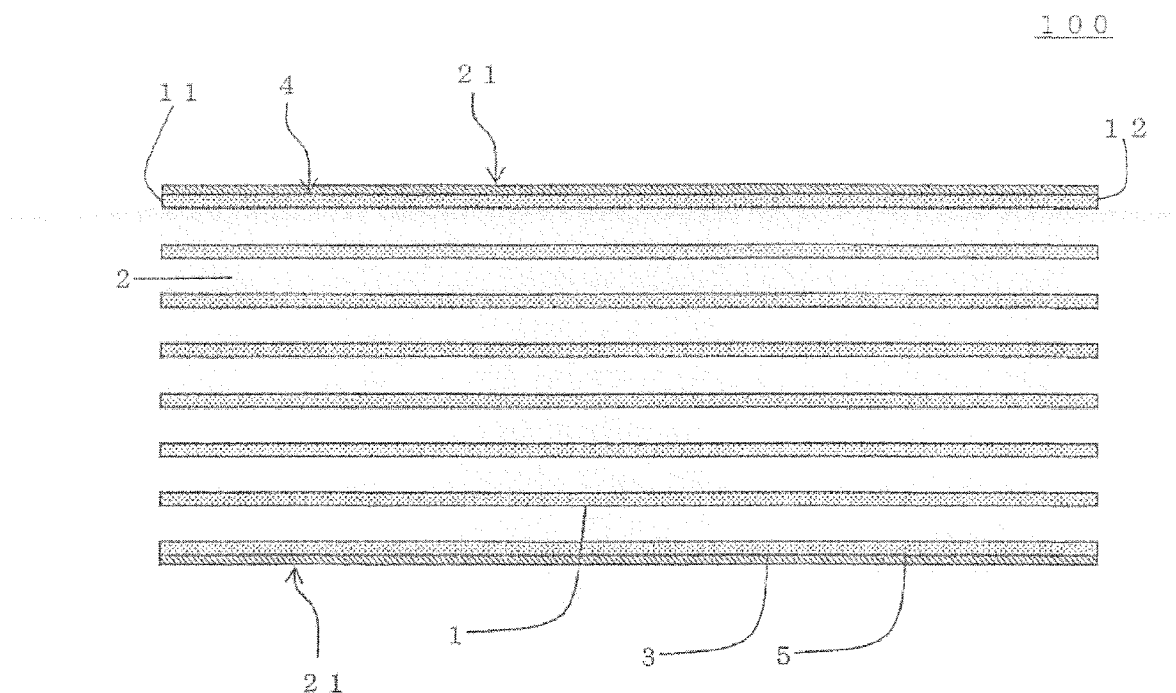
FIG. 2 is a schematic view showing a cross section parallel to a cell extending direction in the one embodiment of the honeycomb structure of the present invention.
Figure 3:
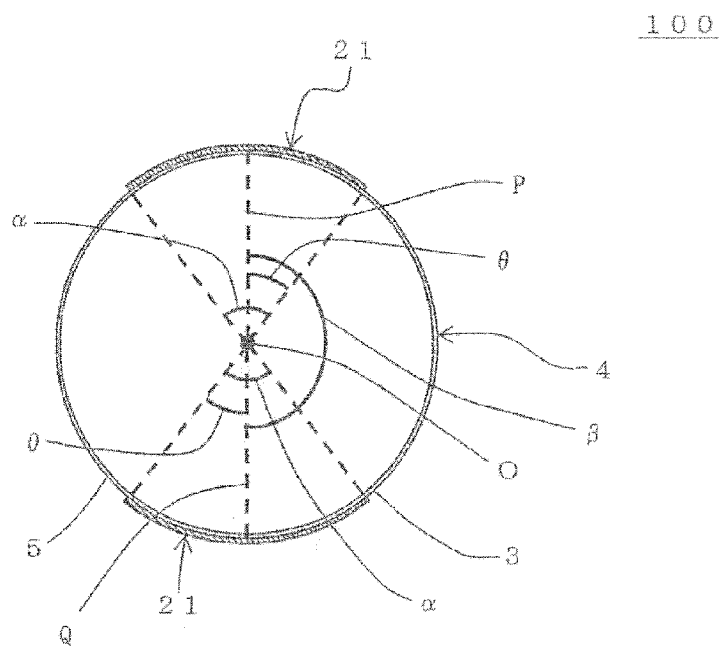
FIG. 3 is a schematic view showing a cross section perpendicular to the cell extending direction in the one embodiment of the honeycomb structure of the present invention.

(1) Honeycomb Structure:

As shown in FIG. 1 to FIG. 3, one embodiment of a honeycomb structure of the present invention is a honeycomb structure 100 including a tubular honeycomb structure body 4, and a pair of electrode sections 21 and 21 disposed on a side surface of the honeycomb structure body 4. The honeycomb structure body 4 has porous partition walls 1 to define and form a plurality of cells 2 as through channels of a fluid which extend from a first end surface 11 as one end surface to a second end surface 12 as the other end surface, and an outer peripheral wall 3 positioned on the outermost periphery. In the honeycomb structure 100 of the present embodiment, an electrical resistivity of the honeycomb structure body 4 is from 1 to 200 Ωcm. Moreover, each of the pair of electrode sections 21 and 21 is formed into a band shape extending in an extending direction of the cells 2 of the honeycomb structure body 4. Furthermore, in a cross section perpendicular to the extending direction of the cells 2, the one electrode section 21 in the pair of electrode sections 21 and 21 is disposed on a side opposite to the other electrode section 21 in the pair of electrode sections 21 and 21 via a center O of the honeycomb structure body 4.

In the honeycomb structure 100 of the present embodiment, the electrode section 21 is constituted of a porous body in which particles made of silicon carbide as an aggregate are bound by a binding material. Moreover, silicon carbide as the aggregate constituting the electrode section 21 contains β-SiC having a stacking fault of 2% or less. Furthermore, the binding material constituting the electrode section 21 contains silicon and a metal silicide. It is to be noted that the one electrode section 21 of the pair of electrode sections 21 and 21 preferably has the above-mentioned constitution, and both the electrode sections 21 and 21 in the pair of electrode sections 21 and 21 more preferably has the above-mentioned constitution.

Here, FIG. 1 is a perspective view schematically showing the one embodiment of the honeycomb structure of the present invention. FIG. 2 is a schematic view showing a cross section parallel to the cell extending direction in the one embodiment of the honeycomb structure of the present invention. FIG. 3 is a schematic view showing the cross section perpendicular to the cell extending direction in the one embodiment of the honeycomb structure of the present invention. It is to be noted that in FIG. 3, the partition walls are omitted.

In the honeycomb structure 100 of the present embodiment, the electrical resistivity of the honeycomb structure body 4 is from 1 to 2000 cm, and hence when a voltage is applied to the honeycomb structure body 4, the honeycomb structure body 4 generates heat. That is, even when a current is allowed to flow through the honeycomb structure body 4 by use of a power source having a high voltage, the current does not excessively flow through the honeycomb structure body 4, and the honeycomb structure can suitably be used as a heater. Furthermore, as described above, the pair of electrode sections 21 and 21 each formed into the band shape are disposed on the opposite sides via the center O of the honeycomb structure body 4. Therefore, it is possible to suppress a deviation of a temperature distribution of the honeycomb structure body 4 when the voltage is applied between the pair of electrode sections 21 and 21.

Furthermore, as described above, silicon carbide as the aggregate constituting the electrode section 21 contains β-SiC having the stacking fault of 2% or less, and hence the electrical resistivity of the electrode section 21 can be lower than that of an electrode section of a conventional honeycomb structure. That is, an electrical resistivity of β-SiC having the stacking fault of 2% or less is low as compared with another silicon carbide, and this β-SiC having the stacking fault of 2% or less is used as the aggregate of the electrode section 21, which can suitably lower the electrical resistivity of the electrode section 21. It is to be noted that examples of the other silicon carbide include β-SiC having a stacking fault in excess of 2%, and α-SiC. In the electrode section of the conventional honeycomb structure, the electrical resistivity of the electrode section has mainly been adjusted by regulating a content ratio of silicon to be contained as the binding material. Therefore, in the conventional honeycomb structure, there has not been made an attempt to lower the electrical resistivity of the electrode section by use of specific silicon carbide as the aggregate of the electrode section.

In the honeycomb structure 100 of the present embodiment, the electrical resistivity of the electrode section 21 can be lowered, and hence the current supplied to the electrode section 21 is suitably transmitted to the whole region of the electrode section 21, so that the current evenly flows from the electrode section 21 to the whole honeycomb structure body 4. Therefore, as compared with the conventional honeycomb structure which also functions as the heater, temperature unevenness during heat generation, in other words, heat generation unevenness can be decreased.

Here, the stacking fault of β-SiC will be described. First, the stacking fault is one of facial lattice defects (face defects). When it is considered that complete crystals are made by periodically stacking atomic faces, the stacking fault indicates occurrence of turbulence in regularity (ordinality) of this stacking. In the present description, the stacking fault (%) of β-SiC is a value calculated in accordance with Equation (1) in the following. Here, A in the following (1) is a value calculated in accordance with Equation (2) in the following.

[Equation 1]

$$\text{stacking fault}(\%) = \frac{A}{6.82 \times 10^{-2} A + 2.27 \times 10^{-2}} + 1.7 A^3 \quad (1)$$

[Equation 2]

$$A = \frac{33.6° \text{ peak intensity}}{41.4° \text{ peak intensity}} \quad (2)$$

Here, "33.6° peak intensity" in Equation (2) is the peak intensity at a scattering angle (2θ) of 33.6° in an X-ray diffraction spectrum by X-ray diffraction (XRD). Moreover, "41.4° peak intensity" is the peak intensity at a scattering angle (2θ) of 41.4° in the X-ray diffraction spectrum by the X-ray diffraction (XRD). In the above X-ray diffraction, a graphite monochrometer is used, and X-ray diffraction analysis is performed by a CuKα ray having a wavelength of 1.54 Å. A tube voltage is 50 kV, and a tube current is 300 mA. A scanning speed is 2θ=2° min⁻¹, and a light receiving slit is set to 0.3 mm. In this way, the peak intensity at the scattering angle 2θ=33.6° and the peak intensity at the scattering angle 2θ=41.4° in the X-ray diffraction spectrum are measured, "A" is calculated in accordance with Equation (2), and the stacking fault of β-SiC can be obtained in accordance with Equation (1). It is to be noted that examples of a reference document in which the stacking fault of β-SiC is described include Reference Documents 1 and 2 described in the following. Reference Document 1: Journal of the Ceramic Society of Japan, 99 [12], p 1179 to 1184, (1991). Reference Document 2: Journal of the Ceramic Society of Japan, 106 [5], p 483 to 487, (1998). Here, the above measuring method of the "stacking fault of β-SiC" will further specifically be described. As to silicon carbide as the aggregate to be contained in the electrode section, when the stacking fault of β-SiC is measured, a sample for the X-ray diffraction measurement is first prepared from the electrode section. This sample the X-ray diffraction measurement can be prepared by cutting the sample from the electrode section so that a cross section measurable by the X-ray diffraction can be acquired. Specifically, concaves and convexes of the cross section are filled with a resin, and polishing is further performed. Next, in a polished surface of the prepared sample, an XRD pattern is measured for each particle of the aggregate to be included in the sample by use of a micro area X-ray diffractometer (manufactured by BRUKER-AXS). To measure the XRD pattern, any 50 particles of the aggregate to be included in the sample are measured at random. Then, in the aggregate judged to be β-Sic from the obtained XRD pattern, a percentage of the stacking fault of β-SiC is obtained in accordance with Equation (1) and Equation (2). Furthermore, when a raw material to form the electrode sections is available, the percentage of the stacking fault of β-SiC may be measured by using powder of the raw material (the raw material powder). For example, in a stage of the raw material powder, the XRD pattern can be measured by the X-ray diffraction device, and the percentage of the stacking fault of β-Sic can be measured in accordance with Equation (1) and Equation (2).

Silicon carbide as the aggregate to be included in the electrode section 21 preferably contains 40 vol % or more of the above-mentioned "β-SiC having the stacking fault of 2% or less". Hereinafter, "β-SiC having the stacking fault of 2% or less" will be referred to as "low stacking fault β-SiC" sometimes. When silicon carbide as the aggregate contains 40 vol % or more of the above low stacking fault β-SiC, the electrical resistivity of the electrode section 21 suitably lowers. It is be noted that silicon carbide as the aggregate contains further preferably 60 vol % or more of low stacking fault β-SiC, and especially preferably from 70 to 100 vol % of low stacking fault β-SiC. It is to be noted that examples of silicon carbide other than "low stacking fault β-SiC" include β-SiC having the stacking fault in excess of 2%, and α-SiC. Here, the measuring method of a volume percentage of the above "low stacking fault β-SiC" will further specifically be described. As to silicon carbide as the aggregate to be included in the electrode section, when the volume percentage of "low stacking fault β-SIC" is measured, a sample for X-ray diffraction measurement is first prepared from the electrode section. This sample for the X-ray diffraction measurement can be prepared by cutting the sample from the electrode section so that a cross section measurable by the X-ray diffraction can be acquired. Specifically, concaves and convexes of the cross section are filled with a resin, and polishing is further performed. Next, in a polished surface of the prepared sample, an XRD pattern is measured for each particle of an aggregate to be included in the sample by use of the micro area X-ray diffractometer (manufactured by BRUKER-AXS). To measure the XRD pattern, any 50 particles of the aggregate to be included in the sample are measured at random. Then, it is judged from the obtained XRD pattern whether each aggregate is the aggregate of "low stacking fault β-SiC" or the aggregate other than "low stacking fault β-SiC". Next, the same view field is photographed by a scanning electron microscope (SEM). An image of the photographed cross section is analyzed by analysis software (Image Pro (trade name) manufactured by Nihon Visual Science Co., Ltd.). Then, a percentage of a total area of the aggregates of "low stacking fault β-SiC" to a total area of the aggregate of "low stacking fault β-SiC" and the aggregate other than "low stacking fault β-SiC" judged from the above-mentioned XRD pattern is calculated, to obtain the volume percentage of "low stacking fault β-SIC". Furthermore, when the raw material to form the electrode sections is available, the volume percentage of "low stacking fault β-SiC" may be measured by using the powder of the raw material (the raw material powder).

A crystallite size of β-SiC is preferably 900 Å or more, further preferably from 900 to 500000 Å, and especially preferably from 1000 to 500000 Å. The crystallite size of β-SiC is a value calculated in accordance with Equation (3) in the following. Equation (3) is Scherrer's formula. Usually, one crystal grain is constituted of fine crystals which can be regarded as a plurality of single crystals, and these fine crystals are called crystallites. A size of this crystallite is the above "crystallite size". When the crystallite size of β-SIC as the aggregate be included in the electrode section is 900 Å or more, the electrical resistivity of the electrode section can suitably be lowered.

[Equation 3]

$$t(\overset{\circ}{A}) = \frac{0.9\lambda}{B\cos\theta_B} \quad (3)$$

Here, "t(Å)" in Equation (3) indicates the crystallite size (Å). "λ" indicates an X-ray wavelength (1.54 Å). "B" indicates a full width at half maximum of a peak of 35.6° of the scattering angle (2θ). "$\theta_B$" is a value of ½ of the scattering angle (2θ), i.e., $\theta_B$=17.8°. The X-ray diffraction spectrum by the X-ray diffraction (XRD) can be measured by a method similar to the method described in the above-mentioned calculating method of the stacking fault of β-SiC. An example of a reference document in which the crystallite size is described is Reference Document 3 in the following. Reference Document 3: authored by Waseda Yoshio, and Matsubara Eiichiro, "X-ray Structure Analysis Determine Atomic Arrangement (Material Science Series)", Uchida Rokakuho Publishing Co., Ltd., Sep. 30, 1999, Second Version issued, p 119 to 123. Here, the above measuring method of "crystallite size of β-SiC" will further specifically be described. As to silicon carbide as the aggregate to be included in the electrode section, when the crystallite size of β-SiC is measured, a sample for the X-ray diffraction measurement is first prepared from the electrode section. This sample for the X-ray diffraction measurement can be prepared by cutting the sample from the electrode section so that a cross section measurable by the X-ray diffraction can be acquired. Specifically, concaves and convexes of the cross section are filled with a resin, and polishing is further performed. Next, in a polished surface of the prepared sample, an XRD pattern is measured for each particle of an aggregate to be included in the sample by use of the micro area X-ray diffractometer (manufactured by BRUKER-AXS). To measure the XRD pattern, any 50 particles of the aggregate to be included in the sample are measured at random. Then, in the aggregate judged to be β-SiC from the obtained XRD pattern, the crystallite size of β-Sic is obtained in accordance with Equation (3). Furthermore, when a raw material to form the electrode sections is available, the crystallite size of β-SiC may be measured by using powder of the raw material (the raw material powder). For example, in the stage of the raw material powder, the XRD pattern can be measured by the X-ray diffraction device, and the crystallite size of β-SiC can be measured in accordance with Equation (3).

As shown in FIG. 1 to FIG. 3, in the honeycomb structure 100 of the present embodiment, the pair of electrode sections 21 and 21 are disposed on a side surface 5 of the honeycomb structure body 4 (the surface of the outer peripheral wall 3). In the honeycomb structure 100 of the present embodiment, when a voltage is applied between the pair of electrode sections 21 and 21, heat is generated. There is not any special restriction on the voltage to be applied, but the voltage is, for example, preferably from 12 to 900 V, and further preferably from 64 to 600 V.

Here, "in the cross section perpendicular to the extending direction of the cells 2, the one electrode section 21 in the pair of electrode sections 21 and 21 is disposed on the side opposite to the other electrode section 21 in the pair of electrode sections 21 and 21 via the center O of the honeycomb structure body 4" has a meaning as follows. First, in the above cross section, an angle formed by "a line segment P connecting a center point of the one electrode section 21 to the center O of the honeycomb structure body 4" and "a line segment Q connecting a center point of the other electrode section 21 to the center O of the honeycomb structure body 4" is an angle β. At this time, in the above meaning, the pair of electrode sections 21 and 21 are disposed in the honeycomb structure body 4 in such a positional relation that the angle β is in a range of 170° to 190° (see FIG. 3). "The center point of the one electrode section 21" is a point of the center in "a peripheral direction of the honeycomb structure body 4". Furthermore, "the center point of the other electrode section 21" is a point of the center in "the peripheral direction of the honeycomb structure body 4". Additionally, the angle 3 is an angle around the "the center O".

A ratio (the binding material/silicon carbide) of a volume of the binding material to a volume of silicon carbide as the aggregate is preferably from 20/80 to 60/40. When the ratio (the binding material/silicon carbide) of the volume of the binding material to the volume of silicon carbide as the aggregate is 20/80", it is meant that to a total volume of silicon carbide as the aggregate and the binding material, a volume percentage of silicon carbide is 80 vol %, and a volume percentage of the binding material is 20 vol %. When the volume percentage of the binding material is smaller than 20 vol %, a strength of the electrode section 21 deteriorates sometimes. When the volume percentage of the binding material is in excess of 60 vol %, silicon to be contained in the binding material jets from the electrode section 21 sometimes. The ratio (the binding material/silicon carbide) of the volume of the binding material to the volume of silicon carbide as the aggregate is further preferably from 25/75 to 50/50, and especially preferably from 30/70 to 40/60. The volume percentages of silicon carbide as the aggregate and the binding material can be obtained by fitting, by a WPPD method, the XRD pattern measured by the X-ray diffraction method (XRD). In the above X-ray diffraction, a graphite monochrometer is used, and X-ray diffraction analysis is performed with a wavelength of a CuKα ray. A tube voltage is 50 kV, and a tube current is 300 mA. A continuous method is used, a measurement region is from 5 to 80°, a scanning speed is 2θ=2° min$^{-1}$, and a light receiving slit is set to 0.3 mm. It is to be noted that an example of a reference document in which the WPPD method is described is Reference Document 4 described in the following. Reference Document 4: Journal of the Ceramic Society of Japan 107 [3] 249 to 257 (1999). Furthermore, when the volume percentages of silicon carbide as the aggregate and the binding material can be obtained in a raw material to prepare the electrode sections 21 (i.e., an electrode section forming raw material), the volume percentages of silicon carbide as the aggregate and the binding material may be measured in a stage of this electrode section forming raw material.

An average particle diameter of the particles made of silicon carbide as the aggregate is preferably from 10 to 70 μm, further preferably from 10 to 50 μm, and especially preferably from 15 to 40 μm. When the average particle diameter of the particles made of silicon carbide to be contained in the electrode section is smaller than 10 μm, the electrical resistivity of the electrode section tends to be high. Furthermore, when the average particle diameter of the particles made of silicon carbide to be contained in the electrode section is in excess of 70 μm, the strength of the electrode section tends to deteriorate.

The average particle diameter of the particles made of silicon carbide (hereinafter, also referred to as "the silicon carbide particles") can be measured by the following method. First, the electrode section is photographed by the scanning electron microscope (SEM). Next, an image of the photographed cross section is analyzed by the analysis software (Image Pro (trade name) manufactured by Nihon Visual Science Co., Ltd.), and particle diameters of the silicon carbide particles to be included in the electrode section are measured. As to the particle diameters of the silicon carbide particles, 50 silicon carbide particles reflected in the cross section image are measured at random, and an average value of the measured particle diameters is obtained as the average particle diameter of the silicon carbide particles. The photographing by the above scanning electron microscope (SEM) is performed at a magnification of 200 times, and a maximum diameter of the silicon carbide particles reflected in the cross section image is measured. It is to be noted that in the present embodiment, the average particle diameter of the respective particles can be obtained by the above-mentioned image analysis of the cross section image taken by the scanning electron microscope (SEM). Furthermore, for example, in a state of particles for use as a raw material, the average particle diameter of the respective particles can be measured by a laser diffraction method. That is, when the respective particles for use as the raw material of the electrode sections are available, the average particle diameter of the particles may be measured in the stage of the raw material. Furthermore, the measuring method in the stage of the raw material may suitably be used together with the measuring method by the image analysis of the cross section image taken by the scanning electron microscope (SEM).

The metal silicide to be contained in the binding material is preferably a metal silicide of at least one selected from the group consisting of nickel and zirconium. When such a metal silicide is contained, the stacking fault of decreases. In consequence, the metal silicide to be contained in the binding material is an important component for obtaining the aggregate made of β-SiC having less stacking fault.

A ratio of a volume of the metal silicide to a total volume of silicon carbide as the aggregate and the binding material is preferably from 1 to 10 vol, further preferably from 4 to 10 vol %, and especially preferably from 4 to 8 vol %. When the ratio of the volume of the metal silicide is smaller than 1 vol %, the electrical resistivity of the electrode section tends be high. On the other hand, when the ratio of the volume of the metal silicide is in excess of 10 vol %, thermal expansion of the electrode section is large sometimes. The ratio of the volume of the metal silicide can be obtained by fitting, by the WPPD method, the XRD pattern measured by the X-ray diffraction method (XRD). This measuring method can be performed in conformity to the measuring method of the volume percentages of silicon carbide as the aggregate and the binding material.

The electrode section may further contain an alkaline earth metal oxide, $Al_2O_3$, and $SiO_2$. According to this constitution, the porosity of the electrode section lowers, and the electrical resistivity of the electrode section further lowers. The electrode section more preferably contains the alkaline earth metal oxide, $Al_2O_3$, and $SiO_2$ as oxide particles of these three components. Furthermore, examples of the above-mentioned alkaline earth metal oxide include MgO and SrO. Above all, the alkaline earth metal oxide is further preferably MgO.

When the electrode section further contains the alkaline earth metal oxide, $Al_2O_3$, and $SiO_2$ and a total volume of silicon carbide as the aggregate and the binding material is 100 parts by volume, the electrode section more preferably contains the alkaline earth metal oxide, $Al_2O_3$, and $SiO_2$ as much as 1 to 10 parts by volume in total. When the above oxide of the three components is contained in the above range of parts by volume, the electrical resistivity of the electrode section more suitably lowers. It is to be noted that when a content ratio of the oxide of the three components is smaller than 1 part by volume, the porosity of the electrode section is high. Furthermore, when the content ratio of the oxide of the three components is in excess of 10 parts by volume, the electrical resistivity of the electrode section tends to be high. The above-mentioned content ratio of the oxide of the three components can be obtained by observing the cross section of the electrode section by the SEM to analyze the image by the image processing software. As the image processing software, Image Pro (manufactured by Nihon Visual Science Co., Ltd.) can be used. Specifically, for example, the sample for observing "the cross section" is first cut from the electrode section. As to the cross section of the electrode section, the concaves and convexes of the cross section are filled with the resin, and the polishing is further performed, to observe the polished surface. Then, from the observation results of five view fields of "the cross section" (the magnification of 1000 times), a total area of the alkaline earth metal oxide, $Al_2O_3$, and $SiO_2$ to a total area of silicon and the aggregate is calculated. Furthermore, when the above content ratio of the oxide of the three components can be obtained in the raw material to prepare the electrode sections (i.e., the electrode section forming raw material), the ratio may be measured in this stage of the electrode section forming raw material.

A thickness of the electrode section is preferably from 50 to 300 μm, further preferably from 100 to 200 μm, and especially preferably from 100 to 150 μm. When the thickness of the electrode section is from 50 to 300 μm, the honeycomb structure body easily generates heat evenly, and the electrode section obtains suitable heat shock resisting properties. For example, when the thickness of the electrode section is smaller than 50 μm, the electrode section is excessively thin, and hence the honeycomb structure body cannot easily generate the heat evenly. Furthermore, when the thickness of the electrode section is in excess of 300 μm, the heat shock resisting properties of the electrode section deteriorate sometimes. The thickness of the electrode section can be measured from an image obtained by photographing a cross section of the honeycomb structure which is vertical to the cell extending direction by the scanning electron microscope (SEM). The thickness of the electrode section is a value of an average thickness of three points of the electrode section in the peripheral direction, in "the center of the honeycomb structure in the cell extending direction". "The value of the average thickness of the three points of the electrode section in the peripheral direction" is a value obtained by the following method. First, the electrode section is divided into three equal portions "in the peripheral direction of the honeycomb structure body", to form three divided portions. That is, the electrode section is divided into the three equal portions by straight lines parallel to the cell extending direction, to form the three divided portions. Next, in each of the three divided portions, a thickness of the center in "the peripheral direction of the honeycomb structure body" is measured, and an average value of measurement results of the obtained thicknesses of the three points is obtained. The obtained average value is "the value of the average thickness of the three points of the electrode section in the peripheral direction".

The porosity of the electrode section is preferably from 10 to 60%, further preferably from 30 to 50%, and especially preferably from 35 to 45%. The porosity of the electrode section is a value of the cross section of the electrode section observed by the SEM and measured by the image processing software. As the image processing software, Image Pro (manufactured by Nihon Visual Science Co., Ltd.) can be used. Specifically, for example, the sample for observing "the cross section" is first cut from the electrode section. As to the cross section of the electrode section, the concaves and convexes of the cross section are filled with the resin, and the polishing is further performed, to observe the polished surface. Then, from the observation results of two view fields of "the cross section" (a magnification of 500 times), a total area pore portions to the whole is calculated. When the porosity of the electrode section is in such a range, excellent heat shock resisting properties are obtained, and the electrical resistivity of the electrode section also lowers. When the porosity of the electrode section is smaller than 10%, a heat capacity of the electrode section is large, and the heat shock resisting properties deteriorate sometimes. When the porosity of the electrode section is in excess of 60%, the electrical resistivity of the electrode section does not easily lower.

β-SiC having the stacking fault of 2% or less which is to be contained in silicon carbide as the aggregate is obtained by using silicon, a carbonaceous substance, and a transition metal to form the silicon into silicon carbide. Usually, in commercially available particles of β-SiC, the stacking fault of β-SiC is often in excess of 2%, and in the honeycomb structure of the present embodiment, the particles of β-SiC prepared as described above and having the stacking fault of 2% or less are preferably used. In general, SiC prepared by the above-mentioned method is called reacted sintered SiC. Reacted sintered SiC is SiC prepared by utilizing reaction among raw materials. Further, as the raw materials, silicon, the carbonaceous substance and the transition metal are used, which decreases the stacking fault of β-SiC to be obtained. An example of the carbonaceous substance is carbon, and more specifically, an example thereof is solid carbon powder.

An electrical resistivity of the electrode section 21 is preferably from 0.01 to 0.4 Ωcm, and further preferably from 0.01 to 0.3 Ωcm. When the electrical resistivity of the electrode section 21 is in such a range, each of the pair of electrode sections 21 and 21 effectively performs a function of an electrode. When the electrical resistivity of the electrode section 21 is smaller than 0.4 Ωcm, the current flows through the whole region of the electrode section 21, and the heat is easily evenly generated in the honeycomb structure body 4. When the electrical resistivity of the electrode section 21 is larger than 0.4 Ωcm, the current does not easily flow through the electrode section 21, and hence the function of the electrode is not easily be performed sometimes. The electrical resistivity of the electrode section is a value at room temperature.

As shown in FIG. 1 to FIG. 3, in the honeycomb structure 100 of the present embodiment, each of the pair of electrode sections 21 and 21 is formed into the band shape extending in the extending direction of the cells 2 of the honeycomb structure body 4. In the cross section perpendicular to the extending direction of the cells 2, an angle of 0.5 times a central angle α of each of the electrode sections 21 and 21 (an angle θ of 0.5 times the central angle α) is preferably from 15 to 65°, and further preferably from 30 to 60°. According to this constitution, it is possible to more effectively suppress the deviation of the current flowing through the honeycomb structure body 4, when the voltage is applied between the pair of electrode sections 21 and 21. That is, the current flowing through the honeycomb structure body 4 can flow more evenly. In consequence, it is possible to suppress the deviation of the heat generation in the honeycomb structure body 4. As shown in FIG. 3, "the central angle α of the electrode section 21" is an angle formed by two line segments connecting both ends of the electrode section 21 to the center O of the honeycomb structure body 4, in the cross section perpendicular to the extending direction of the cells 2. In other words, "the central angle α of the electrode section 21" is an inner angle of a portion of the center O, in a shape (e.g., a fan shape) formed by "the electrode section 21", "the line segment connecting one end portion of the electrode section 21 to the center O", and "the line segment connecting the other end portion of the electrode section 21 to the center O".

Moreover, "the angle θ of 0.5 times the central angle α" of the one electrode section 21 preferably has a size of 0.8 to 1.2 times, and further preferably has a size of 1.0 times (the same size) to "the angle θ of 0.5 times the central angle α" of the other electrode section 21. Consequently, when the voltage is applied between the pair of electrode sections 21 and 21, it is possible to more effectively suppress the deviation of the current flowing through the honeycomb structure body 4, whereby it is possible to more effectively suppress the deviation of the heat generation in the honeycomb structure body 4.

In the honeycomb structure 100 of the present embodiment, each of the pair of electrode sections 21 and 21 extends in the cell extending direction of the honeycomb structure body 4, and is formed into the band shape "extending between both the end portions". In this way, the pair of electrode sections 21 and 21 are disposed to extend between both the end portions of the honeycomb structure body 4, whereby when the voltage is applied between the pair of electrode sections 21 and 21, it is possible to more effectively suppress the deviation of the current flowing through the honeycomb structure body 4. Furthermore, it is accordingly possible to more effectively suppress the deviation of the heat generation in the honeycomb structure body 4. Here, when "the electrode section 21 is formed (disposed) to extend between both the end portions of the honeycomb structure body 4", a state is meant as follows. That is, it is meant that the one end portion of the electrode section 21 comes in contact with one end portion (one end surface) of the honeycomb structure body 4, and the other end portion of the electrode section 21 comes in contact with the other end portion (the other end surface) of the honeycomb structure body 4.

In the honeycomb structure 100 of the present embodiment, both the end portions of the electrode section 21 in "the extending direction of the cells 2 of the honeycomb structure body 4" do not come in contact with (do not reach) the first end surface 11 and the second end surface 12 of the honeycomb structure body 4 in another preferable configuration. Moreover, the one end portion of the electrode section 21 comes in contact with (reaches), for example, the first end surface 11 of the honeycomb structure body 4, and the other end portion of the electrode section 21 does not come in contact with (does not reach) the second end surface 12 of the honeycomb structure body 4 in still another preferable configuration. In this way, in the structure where at least one end portion of the electrode section 21 does not come in contact with (does not reach) the first end surface 11 or the second end surface 12 of the honeycomb structure body 4, the heat shock resisting properties of the honeycomb structure can be enhanced. That is, each of the pair of electrode sections 21 and 21 preferably has the structure where at least one end portion does not come in contact with (does not reach) the first end surface 11 or the second end surface 12 of the honeycomb structure body 4, from the viewpoint that "the heat shock resisting properties of the honeycomb structure are enhanced". From the above, when importance is attached to the viewpoint that "the deviation of the current in the honeycomb structure body 4 is more effectively suppressed to more effectively suppress the deviation of the heat generation", the pair of electrode sections 21 and 21 are preferably formed to extend between both the end portions of the honeycomb structure body 4. On the other hand, when importance is attached to the viewpoint that "the heat shock resisting properties of the honeycomb structure are enhanced", at least one end portion of each of the pair of electrode sections 21 and 21 preferably does not come in contact with (does not reach) the first end surface 11 or the second end surface 12 of the honeycomb structure body 4.

In the honeycomb structure 100 shown in FIG. 1 to FIG. 3, the electrode section 21 has a shape obtained by bending a planar rectangular member along an outer periphery of a cylindrical shape. Here, when the bent electrode section 21 is deformed so that the section becomes a planar member which is not bent, the shape of the section will be referred to as "a planar shape" of the electrode section 21. "The planar shape" of the electrode section 21 shown in FIG. 1 to FIG. 3 is a rectangular shape. Furthermore, "an outer peripheral shape of the electrode section" means "the outer peripheral shape in the planar shape of the electrode section".

As shown in FIG. 1 to FIG. 3, the outer peripheral shape of the band-like electrode section 21 may be the rectangular shape, but the outer peripheral shape of the band-like electrode section 21 is "a shape in which corner portions of the rectangular shape are curvedly formed" in another preferable configuration. Furthermore, the outer peripheral shape of the band-like electrode section 21 is "a shape in which the corner portions of the rectangular shape are linearly chamfered" in still another configuration. A composite application of "a curved form" and "a linear form" is also preferable. The composite application of "the curved form" and "the linear form" means, for example, a shape in which at least one of corner portions has "a curvedly formed shape", and at least one of the corner portions has "a linearly chamfered shape", in the rectangular shape.

The outer peripheral shape of the electrode section 21 is "the shape in which the corner portions of the rectangular shape are curvedly formed" or "the shape in which the corner portions of the rectangular shape are linearly chamfered", which can further enhance the heat shock resisting properties of the honeycomb structure 100. When the corner portions of the electrode section 21 have right angles, stress in the vicinity of "each corner portion of the electrode section 21" in the honeycomb structure section 4 tends to be relatively high as compared with the other portions. In contrast, when the corner portion of the electrode section 21 is curvedly or linearly chamfered, it is possible to decrease the stress in the vicinity of the corner portion of the electrode section 21" in the honeycomb structure body 4.

As to the honeycomb structure body 4 for use in the honeycomb structure 100 of the present embodiment, it is possible to use the honeycomb structure body 4 for use in a conventional honeycomb structure which is a catalyst carrier and also functions as a heater when a voltage is applied thereto. Hereinafter, a constitution of the honeycomb structure body 4 will be described, but the honeycomb structure 100 of the present embodiment is not limited to the honeycomb structure body 4.

In the honeycomb structure 100 of the present embodiment, a material of the partition walls 1 and the outer peripheral wall 3 preferably contains a silicon-silicon carbide composite material or silicon carbide as a main component, and is further preferably the silicon-silicon carbide composite material or silicon carbide. When "the material of the partition walls 1 and the outer peripheral wall 3 contains silicon carbide particles and silicon as main components", it is meant that the partition walls 1 and the outer peripheral wall 3 contain 90 mass % or more of the silicon carbide particles and silicon (a total mass) in the whole material. By use of such a material, the electrical resistivity of the honeycomb structure body 4 can be from 1 to 200 Ωcm. Here, the silicon-silicon carbide composite material contains the silicon carbide particles as an aggregate, and silicon as a binding material which binds the silicon carbide particles, and the plurality of silicon carbide particles are preferably bound by silicon so as to form pores among the silicon carbide particles. Furthermore, the silicon carbide is obtained by sintering silicon carbide. The electrical resistivity of the honeycomb structure body 4 is a value at 400° C.

In the honeycomb structure body 4, a thickness of the partition walls 1 is preferably from 50 to 200 μm, and further preferably from 70 to 130 μm. With the result that the thickness of the partition walls 1 is in such a range, it is possible to prevent a pressure loss during the flowing of an exhaust gas from being excessively large, even when the honeycomb structure 100 is used as the catalyst carrier and a catalyst is loaded thereonto. When the thickness of the partition walls 1 is smaller than 50 μm, a strength of the honeycomb structure 100 deteriorates sometimes. When the thickness of the partition walls 1 is larger than 200 μm and when the honeycomb structure 100 is used as the catalyst carrier and the catalyst is loaded thereonto, the pressure loss during the flowing of the exhaust gas is large sometimes.

In the honeycomb structure body 4, a cell density is preferably from 40 to 150 cells/cm$^2$, and further preferably from 70 to 100 cells/cm$^2$. With the result that the cell density is in such a range, in a state where the pressure loss during the flowing of the exhaust gas is small, a purification performance of the catalyst can be heightened. When the cell density is lower than 40 cells/cm$^2$, a catalyst loading area decreases sometimes. When the cell density is higher than 150 cells/cm$^2$, the pressure loss during the flowing of the exhaust gas is large sometimes, when the honeycomb structure 100 is used as the catalyst carrier and the catalyst is loaded thereonto.

An average particle diameter of the silicon carbide particles (the aggregate) constituting the honeycomb structure body 4 is preferably from 3 to 50 μm, and further preferably from 3 to 40 μm. With the result that the average particle diameter of the silicon carbide particles constituting the honeycomb structure body 4 is in such a range, the electrical resistivity of the honeycomb structure body 4 at 400° C. can be from 1 to 200 Ωcm. When the average particle diameter of the silicon carbide particles is smaller than 3 μm, the electrical resistivity of the honeycomb structure body 4 is large sometimes. When the average particle diameter of the silicon carbide particles is larger than 50 μm, the electrical resistivity of the honeycomb structure body 4 is small sometimes. Furthermore, when the average particle diameter of the silicon carbide particles is larger than 50 μm, a die for extrusion-forming is clogged with a forming raw material sometimes during the extrusion-forming of the honeycomb formed body.

The electrical resistivity of the honeycomb structure body 4 is from 1 to 200 Ωcm, and preferably from 10 to 100 Ωcm. When the electrical resistivity is smaller than 1 Ωcm and, for example, when the honeycomb structure 100 is energized by a power source of a high voltage of 200 V or more (the voltage is not limited to 200 V), the current excessively flows sometimes. When the electrical resistivity is larger than 200 Ωcm and, for example, when the honeycomb structure 100 is energized by the power source of the high voltage of 200 V or more (the voltage is not limited to 200 V), the current does not easily flow, and the heat is not sufficiently generated sometimes. The electrical resistivity of the honeycomb structure body 4 is a value measured by a four-terminals method.

The electrical resistivity of the electrode section 21 is preferably lower than the electrical resistivity of the honeycomb structure body 4. Furthermore, the electrical resistivity of the electrode section 21 is further preferably 20% or less, and especially preferably from 0.1 to 10% of the electrical resistivity of the honeycomb structure body 4. When the electrical resistivity of the electrode section 21 is 20% or less of the electrical resistivity of the honeycomb structure body 4, the electrode section 21 more effectively functions as the electrode.

When the material of the honeycomb structure body 4 is the silicon-silicon carbide composite material, the honeycomb structure body 4 preferably has the following constitution. A ratio of "a mass of silicon" to be contained in the honeycomb structure body 4 to a total of "a mass of the silicon carbide particles" to be contained in the honeycomb structure body 4 and "a mass of silicon" to be contained in the honeycomb structure body 4 is preferably from 10 to 40 mass %. When this ratio is lower than 10 mass, the strength of the honeycomb structure deteriorates sometimes. When the ratio is higher than 40 mass %, the shape cannot be held during the firing. The ratio of "the mass of silicon" to be contained in the honeycomb structure body 4 to the total of "the mass of the silicon carbide particles" to be contained in the honeycomb structure body 4 and "the mass silicon" to be contained in the honeycomb structure body 4 is further preferably from 15 to 35 mass %.

A porosity of the partition walls 1 of the honeycomb structure body 4 is preferably from 35 to 60%, and further preferably from 35 to 45%. When the porosity is smaller than 35%, the deformation during the firing is large sometimes. When the porosity is in excess of 60%, the strength of the honeycomb structure deteriorates sometimes. The porosity is a value measured by a mercury porosimeter.

An average pore diameter of the partition walls 1 of the honeycomb structure body 4 is preferably from 2 to 15 μm, and further preferably from 4 to 8 μm. When the average pore diameter is smaller than 2 μm, the electrical resistivity is excessively large sometimes. When the average pore diameter is larger than 15 μm, the electrical resistivity is excessively small sometimes. The average pore diameter is a value measured by the mercury porosimeter.

Moreover, a thickness of the outer peripheral wall 3 constituting the outermost periphery of the honeycomb structure body 4 is preferably from 0.1 to 2 mm. When the thickness is smaller than 0.1 mm, the strength of the honeycomb structure 100 deteriorates sometimes. When the thickness is larger than 2 mm, an area of the partition walls 1 onto which the catalyst is loaded is small sometimes.

In the honeycomb structure body 4, a shape of the cells 2 in the cross section perpendicular to the extending direction of the cells 2 is preferably a quadrangular shape, a hexagonal shape, an octagonal shape, or any combination of these shapes. As the shape of the cells 2, a square shape and the hexagonal shape are preferable. With such a cell shape, the pressure loss during the flowing of the exhaust gas through the honeycomb structure 100 is small, and the purification performance of the catalyst is excellent.

There is not any special restriction on the whole shape of the honeycomb structure body 4. Examples of the shape of the honeycomb structure body 4 include a tubular shape with a round bottom surface (a cylindrical shape), a tubular shape with an oval bottom surface, and a tubular shape with a bottom surface having a polygonal shape (a Quadrangular shape, a pentangular shape, a hexagonal shape, a heptagonal shape, an octagonal shape, or the like). Moreover, as to a size of the honeycomb structure body 4, an area of the bottom surface is preferably from 2000 to 20000 mm$^2$, and further preferably from 4000 to 10000 mm$^2$. Furthermore, a length of the honeycomb structure body 4 in a central axis direction is preferably from 50 to 200 mm, and further preferably from 75 to 150 mm.

An isostatic strength of the honeycomb structure 100 is preferably 1 MPa or more, and further preferably 3 MPa or more. The larger value of the isostatic strength is more preferable, but when a material, a structure and the like of the honeycomb structure 100 are taken into consideration, an upper limit of the isostatic strength is about 6 MPa. When the isostatic strength is smaller than 1 MPa, the honeycomb structure 100 easily breaks sometimes during use of the honeycomb structure as the catalyst carrier or the like. The isostatic strength is a value measured under a hydrostatic pressure in water.

The honeycomb structure 100 of the present embodiment, onto which the catalyst is loaded, is preferably used as a catalyst body.

(2) Manufacturing Method of Honeycomb Structure:

Next, one embodiment of a manufacturing method of the honeycomb structure of the present invention will be described. The manufacturing method of the honeycomb structure of the present embodiment includes an electrode section forming step of forming a pair of electrode sections. In the electrode section forming step, an electrode section forming raw material is first applied to each of a first region and a second region of a side surface of a tubular honeycomb formed body, or a fired honeycomb body obtained by firing this honeycomb formed body. Next, the applied electrode section forming raw material is dried and fired, to form the pair of electrode sections. The tubular honeycomb formed body has partition walls to define and form a plurality of cells as through channels of a fluid which extend from a first end surface as one end surface to a second end surface as the other end surface, and an outer peripheral wall positioned on the outermost periphery. It is to be noted that a preparing method of the tubular honeycomb formed body will be described later.

In this electrode section forming step, the electrode section forming raw material is applied so that in a cross section perpendicular to an extending direction of the cells of the honeycomb formed body or the fired honeycomb body, the first region is positioned on a side opposite to the second region via the center of the honeycomb formed body or the fired honeycomb body. Moreover, in the manufacturing method of the honeycomb structure of the present embodiment, as the electrode ion forming raw material, an electrode section forming raw material prepared as follows is used. That is, the electrode section forming raw material includes particles made of silicon carbide as an aggregate and silicon which becomes a binding material, and silicon carbide as the aggregate contains β-SiC having a stacking fault of 2% or less. The electrode section forming step is performed by using such an electrode section forming raw material, whereby the hitherto described honeycomb structure 100 shown in FIG. 1 to FIG. 3 can simply be manufactured.

In the manufacturing method of the honeycomb structure of the present embodiment, β-Sic having the stacking fault of 2% or less which is to be contained in silicon carbide as the aggregate is preferably obtained by using an aggregate material including silicon, a carbonaceous substance, and a transition metal. An example of the carbonaceous substance is solid carbon powder. This carbonaceous substance is further preferably carbon black. β-sic is prepared by such a method, so that β-SiC having the stacking fault of 2% or less can suitably be obtained. However, the preparing method of β-SiC having the stacking fault of 2% or less is not limited to the above-mentioned method. Furthermore, when β-SiC having the stacking fault of 2% or less is available, prepared particles of β-SiC may be used.

In the manufacturing method of the honeycomb structure of the present embodiment, the transition metal to be included in the aggregate material is preferably at least one selected from the group consisting of nickel and zirconium. Such nickel or zirconium is included in the aggregate material, which further decreases the stacking fault of β-SiC. Nickel and zirconium become a metal silicide, when the β-SiC is prepared from the above aggregate material. That is, β-SiC having the stacking fault of 2% or less which is obtained from the above aggregate material includes particles of the β-sic, the metal silicide obtained by silicification of the transition metal, and unreacted silicon. Furthermore, this metal silicide obtained by the silicification of the transition metal is the metal silicide to be included in the binding material in the hitherto described honeycomb structure of the present embodiment.

Silicon to be included in the aggregate material is preferably a particulate material having an average particle diameter of 50 μm or more, and further preferably a particulate material of 50 to 500 μm. By use of particulate silicon having the average particle diameter of 50 μm or more, the stacking fault of the obtained. β-SiC further decreases.

Further, in the electrode section forming step, as silicon carbide is the aggregate to be included in the electrode section forming raw material, silicon carbide powder having an average particle diameter of 10 to 70 μm is preferably used. When the average particle diameter is smaller than 10 μm, the electrical resistivity of the electrode section tends to be high. Moreover, when the average particle diameter is in excess of 70 μm, the strength of the electrode section tends to deteriorate. The average particle diameter of the silicon carbide powder is a value measured by a laser diffraction method.

In the electrode section forming step, as silicon be included in the electrode section forming raw material, silicon powder having an average particle diameter of 2 to 15 μm is preferably used. The silicon powder is molten during the firing of the electrode section forming raw material, to become a binding material which binds aggregate particles with one another. When an average particle diameter of the silicon powder is smaller than 2 µm, silicon easily jets from the obtained electrode sections sometimes. Moreover, when the average particle diameter of the silicon powder is in excess of 15 µm, a porosity of the electrode sections is high, and an electrical resistivity of the electrode sections does not sufficiently lower sometimes. The silicon powder having an average particle diameter of 2 to 15 µm is used as silicon, whereby silicon does not easily jet from the obtained electrode sections. Furthermore, the electrode sections have a low porosity (i.e., become dense), and the electrical resistivity of the electrode sections lowers. The average particle diameter of the silicon powder is further preferably from 5 to 10 µm. The average particle diameter of the silicon powder is a value measured by the laser diffraction method.

The silicon powder is preferably metal silicon powder. This metal silicon powder further preferably includes predetermined impurities as follows, except silicon (Si). Examples of the impurities include Fe, Al, Ca, B, and P. A content of silicon in the silicon powder is preferably from 90.0 to 99.9 at % (an atomic percentage). When the content of silicon is smaller than 90.0 at %, the heat resisting properties of the electrode sections deteriorate sometimes, or the thermal expansion of the electrode sections is large sometimes. When the content of silicon is 99.9 at % or less, in other words, when more than 0.1 at % of the above-mentioned impurities are included, the electrical resistivity of the electrode sections further lowers.

Hereinafter, the manufacturing method of the honeycomb structure of the present embodiment will be described in more detail in accordance with a manufacturing method of the honeycomb structure shown in FIG. 1 to FIG. 3 as an example.

First, the honeycomb formed body is prepared by the following method. The silicon powder (silicon), a binder, a surfactant, a pore former, water and the like are added to silicon carbide powder (silicon carbide), to prepare a honeycomb forming raw material. A mass of silicon to a total of a mass of the silicon carbide powder and the mass of silicon is preferably from 10 to 40 mass. An average particle diameter of silicon carbide particles in the silicon carbide powder is preferably from 3 to 50 µm, and further preferably from 3 to 40 µl. An average particle diameter of silicon particles (the silicon powder) is preferably from 2 to 35 µm. The average particle diameters of the silicon carbide particles and the silicon particles are values measured by the laser diffraction method. The silicon carbide particles are fine particles of silicon carbide constituting the silicon carbide powder, and the silicon particles are fine particles of silicon constituting the silicon powder. It is to be noted that this is a blend of the honeycomb forming raw material, when a material of the honeycomb structure body is a silicon-silicon carbide composite material. When the material of the honeycomb structure body is silicon carbide, silicon is not added.

Examples of the binder include methylcellulose, hydroxypropyl methylcelliose, hydroxypropoxyl cellulose, hydroxyethylcellulose, carboxymethylcellulose, and polyvinyl alcohol. Among these binders, methylcellulose and hydroxypropoxyl cellulose are preferably used together. A content of the binder is preferably from 2.0 to 10.0 parts by mass, when the total mass of the silicon carbide powder and the silicon powder is 100 parts by mass.

A content of the water is preferably from 20 to 60 parts by mass, when the total mass of the silicon carbide powder and the silicon powder is 100 parts by mass.

As the surfactant, ethylene glycol, dextrin, fatty acid soap, polyalcohol or the like can be used. One of these surfactants may be used alone, or any combination of two or more of the surfactants may be used. A content of the surfactant is preferably from 0.1 to 2.0 parts by mass, when the total mass of the silicon carbide powder and the silicon powder is 100 parts by mass.

As long as the pore former becomes pores after the firing, there is not any special restriction on the pore former, and examples of the pore former include graphite, starch, resin balloons, a water-absorbing resin, and silica gel. A content of the pore former is preferably from 0.5 to 10.0 parts by mass, when the total mass of the silicon carbide powder and the silicon powder is 100 parts by mass. An average particle diameter of the pore former is preferably from 10 to 30 µm. When the average particle diameter is smaller than 10 µm, the pores cannot sufficiently be formed sometimes. When the average particle diameter is larger than 30 µm, a die is clogged with the pore former sometimes during formation. The average particle diameter of the pore former is a value measured by the laser diffraction method. When the pore former is the water-absorbing resin, the average particle diameter of the pore former is an average particle diameter after water absorption.

Next, the honeycomb forming raw material is kneaded to form a kneaded material. There is not any special restriction on a method of kneading the honeycomb forming raw material to form the kneaded material, and an example of the method is a method using a kneader, a vacuum clay kneader or the like.

Next, the honeycomb formed body is prepared by the extrusion-forming of the kneaded material. During the extrusion-forming, a die having a desirable whole shape, cell shape, partition wall thickness, cell density and the like is preferably used. As a material of the die, a hard metal which does not easily wear down is preferable. The honeycomb formed body has a structure having partition walls to define and form a plurality of cells as through channels of a fluid, and an outer peripheral wall positioned on the outermost periphery.

A partition wall thickness, a cell density, an outer peripheral wall thickness and the like of the honeycomb formed body can suitably be determined in accordance with a structure of the honeycomb structure of the present invention to be prepared, in consideration of shrinkage during the drying and the firing.

Next, the obtained honeycomb formed body is preferably dried. The honeycomb formed body after the drying will be referred to as "the dried honeycomb body" sometimes. There is not any special restriction on a drying method, but examples of the drying method include electromagnetic heating systems such as microwave heating drying and high frequency dielectric heating drying, and external hearing systems such as hot air drying, and superheat steam drying. Among these methods, it is preferable that a predetermined amount of a water content is dried by the electromagnetic heating system, and then the remaining water content is dried by the external heating system, because the whole formed body can rapidly and evenly be dried so that cracks are not generated. As drying conditions, 30 to 99 mass % of the water content is preferably removed from an amount of the water content prior to the drying by the electromagnetic heating system, and then the water content is preferably decreased to 3 mass % or less by the external heating system. As the electromagnetic heating system, the dielectric heating drying is preferable, and as the external heating system, the hot air drying is preferable.

When a length of the honeycomb formed body (the dried honeycomb body) in a central axis direction is not a desirable length, both end surfaces (both end portions) are preferably cut to obtain the desirable length. There is not any special restriction on a cutting method, but an example of the method is a method using a round saw cutter or the like.

Here, a preparing method of "β-SiC having the stacking fault of 2% or less (low stacking fault β-SIC)" will be described.

First, silicon powder is mixed with carbonaceous powder, transition metal powder, water and the like obtain a mixed raw material. To 100 parts by mass of the silicon powder, the carbonaceous powder is preferably from 20 to 40 parts by mass, further preferably from 25 to 35 parts by mass, and especially preferably from 30 to 35 parts by mass. Moreover, to an atomic number of 100 of the silicon powder, an atomic number of the transition metal powder is preferably from 1 to 10, further preferably from 3 to 8, and especially preferably from 3 to 5. Furthermore, 20 to 100 parts by mass of water is preferably added, when a total mass of the silicon powder, the carbonaceous powder and the transition metal powder is 100 parts by mass.

An average particle diameter of the silicon powder is preferably 50 μm or more, and further preferably from 50 to 500 μm. The average particle diameter of the silicon powder is a value measured by the laser diffraction method.

As the carbonaceous powder, amorphous carbonaceous powder is preferable, and carbon black is especially preferable. It is to be noted that as the carbonaceous powder, such crystalline carbon (in other words, carbon in which a crystal structure is developed) as black lead (i.e., graphite) is not preferable.

Next, the obtained mixed raw material is formed by press forming, extrusion forming or the like. It is to be noted that instead of mixing the silicon powder with the carbonaceous powder, the transition metal powder, the water and the like to obtain the mixed raw material in advance, each raw material powder may individually be formed. That is, as described above, the mixed raw material is not prepared by mixing the silicon powder with the carbonaceous powder, the transition metal powder, the water and the like, but the carbonaceous powder, the silicon powder and the transition metal powder may separately be formed. Specifically, first, the carbonaceous powder is mixed with the water and the like to obtain a first mixed raw material, and the silicon powder is mixed with the transition metal powder, the water and the like to obtain a second mixed raw material. Next, the first mixed raw material is formed by the press forming, the extrusion forming or the like to obtain a first formed body, and the second mixed raw material is formed by the press forming, the extrusion forming or the like to obtain a second formed body. When the first formed body and the second formed body are prepared as described above, the first formed body and the second formed body are laminated, and then the subsequent steps are preferably performed.

Next, the obtained formed body is dried to obtain a dried body. A drying temperature is preferably from 50 to 100° C. Next, the obtained dried body is fired to obtain a fired body. The dried body is preferably fired in an inert atmosphere of argon or the like. A firing temperature is preferably from 1300 to 1500° C. A firing time is preferably from one to 20 hours.

Next, the obtained fired body is ground by an impact type grinder or the like. In this way, ground particles are obtained by grinding the fired body. The obtained ground particles are regulated into a preferable average article diameter by a sieve or the like. The powder obtained in this manner is mixed powder including low stacking fault β-SiC, silicon, and metal silicide.

Next, the electrode section forming raw material to form the electrode sections is prepared. The electrode section forming raw material is preferably formed by adding predetermined additives to mixed powder containing silicon carbide as an aggregate, and silicon powder which becomes a binding material, followed by the kneading. As to the aggregate, it is possible to suitably use the silicon carbide powder containing low stacking fault β-SiC, which is the preferable example of the aggregate of the electrode sections in the honeycomb structure of the present embodiment.

Specifically, to the mixed powder containing low stacking fault β-SiC, there are added silicon carbide powder other than low stacking fault β-SiC, silicon powder, a binder, a moisture retaining agent, a dispersant, water and the like, followed by the kneading of the obtained mixture, to prepare a paste-like electrode section forming raw material. Silicon carbide as the aggregate preferably contains 40 vol % or more of the above-mentioned "β-SiC having the stacking fault of 2% or less". An example of the mixed powder containing low stacking fault β-SiC is mixed powder obtained by the above-mentioned preparing method of "β-SiC having the stacking fault of 2% or less (low stacking fault β-SiC)". There is not any special restriction on a kneading method, and, for example, a vertical stirring machine can be used.

Examples of the binder include methylcellulose, hydroxypropyl methylcellulose, hydroxypropoxyl cellulose, hydroxyethylcellulose, carboxymethylcellulose, and polyvinyl alcohol. Among these binders, methylcellulose and hydroxypropoxyl cellulose are preferable. A content of the binder is preferably from 0.1 to 5.0 parts by mass, when a total mass of the mixed powder containing low stacking fault β-SiC, the silicon carbide powder other than low stacking fault β-SiC and the silicon powder is 100 parts by mass. An example of the moisture retaining agent is glycerin.

As the dispersant, for example, as a surfactant, glycerin, ethylene glycol, dextrin, fatty acid soap, polyalcohol or the like can be used. One of these surfactants may be used alone, or any combination of two or more of the surfactants may be used. A content of the surfactant is preferably from 0.1 to 2.0 parts by mass, when the total mass of the mixed powder containing low stacking fault β-SiC, the silicon carbide powder other than low stacking fault β-SiC and the silicon powder is 100 parts by mass.

A content of the water is preferably from 15 to 60 parts by mass, when the total mass of the mixed powder containing low stacking fault 13-SIC, the silicon carbide powder other than low stacking fault β-SiC and the silicon powder is 100 parts by mass.

Moreover, to the electrode section forming raw material, there may further be added oxide particles containing three components of an alkaline earth metal oxide, $Al_2O_3$, and $SiO_2$. Examples of the alkaline earth metal oxide include MgO and SrO. An example of such oxide particles includes cordierite particles. When a total volume of the mixed powder containing low stacking fault β-SiC, the silicon carbide powder other than low stacking fault β-SiC and the silicon powder is 100 parts by volume, the alkaline earth metal oxide, $Al_2O_3$ and $SiO_2$ are more preferably included as much as 1 to 10 parts by volume in total.

Next, the obtained electrode section forming raw material is preferably applied to the side surface of the dried honeycomb formed body (hereinafter, the dried honeycomb formed body will be referred to as "the dried honeycomb body" sometimes). There is not any special restriction on a method of applying the electrode section forming raw material to the side surface of the dried honeycomb body, but, for example, a printing method can be used. Furthermore, the electrode section forming raw material is preferably applied to the side surface of the dried honeycomb body, so as to obtain the shape of the electrode sections in the hitherto described honeycomb structure. That is, when regions to which the electrode section forming raw material is to be applied are a first region and a second region, the first region is positioned on a side opposite to the second region via the center of the dried honeycomb body, in a cross section perpendicular to an extending direction of cells of the dried honeycomb body. A thickness of the electrode section can be set to a desirable thickness by regulating a thickness of the electrode section forming raw material during the application thereof. The electrode sections can simply be formed by applying the electrode section forming raw material to the side surface of the dried honeycomb body, followed by the drying and the firing in this way, so that the electrode sections can very easily be formed. A firing step is only performed once, and hence the electrode section forming raw material is preferably applied to the side surface of the dried honeycomb formed body (the dried honeycomb body). However, the dried honeycomb formed body can be fired, to first prepare the fired honeycomb body, and then the electrode section forming raw material can be applied to the side surface of this fired honeycomb body.

Next, the electrode section forming raw material applied to the side surface of the dried honeycomb body is preferably dried, to prepare "the dried honeycomb body with the electrode section forming raw material". Drying conditions are preferably from 50 to 100° C.

Next, the dried honeycomb body with the electrode section forming raw material is preferably fired to prepare the honeycomb structure. It is to be noted that the binder and the like are removed prior to the firing, and hence calcinating is preferably performed. The calcinating is preferably performed at 400 to 500° C. in the air atmosphere for 0.5 to 20 hours.

As firing conditions, heating is preferably performed at 1400 to 1500° C. in an inert atmosphere of argon or the like for one to 20 hours. Moreover, after the firing, an oxygenation treatment is preferably performed at 1200 to 1350° C. for one to ten hours for the purpose of enhancement of durability. There is not any special restriction on calcinating and firing methods, and the firing can be performed by using an electric furnace, a gas furnace or the like. In such a manner as described above, the honeycomb structure 100 shown in FIG. 1 to FIG. 3 can be manufactured.

In the hitherto described manufacturing method, "the mixed powder containing low stacking fault β-SiC" is first prepared, and the electrode section is prepared by using the "mixed powder containing low stacking fault β-SiC". However, the preparing method of the electrode section, in other words, low stacking fault β-SiC is not limited to such a method. For example, the mixed raw material obtained by mixing the silicon powder with the carbonaceous powder, the transition metal powder, the water and the like is applied to the surface of the honeycomb formed body or the dried honeycomb body, and then the drying, degreasing and firing are performed, so that the electrode sections can be prepared. An example of the above mixed raw material is a raw material (a mixed raw material) for use in the above-mentioned preparing method of "β-SiC having the stacking fault of 2% or less (low stacking fault β-SiC)". According to this method, during the preparation of the electrode sections, "the mixed powder containing low stacking fault β-SiC" is simultaneously prepared.

EXAMPLES

Hereinafter, the present invention will further specifically be described with respect to examples, but the present invention is not limited to these examples.

(Silicon Carbide Powder for Aggregate)

In examples and comparative examples, as aggregates of electrode section forming raw materials, silicon carbide powder (1) to silicon carbide powder (5) described in the following were used.

(Silicon Carbide Powder (1))

The silicon carbide powder (1) (hereinafter, also referred to as "SiC (1)") was prepared by the following method. First, there were prepared 100 g of metal silicon powder having an average particle diameter of 58 μm (a density of 2.33 g/cm), 33 g of carbon black powder having a specific surface area of 110 m²/g, 10.5 g of Ni powder having an average particle diameter of 33 μm, and 100 g of water. These materials were mixed, and mixed powder obtained by the mixing was press-formed, to prepare a formed body for the silicon carbide powder (1). Next, the obtained formed body for the silicon carbide powder (1) was dried at 100° C., to obtain a dried body for the silicon carbide powder (1). Next, the obtained dried body for the silicon carbide powder (1) was fired at 1450° C. in an argon atmosphere for two hours, to obtain a fired body for the silicon carbide powder (1). Next, the obtained fired body for the silicon carbide powder (1) was ground, to obtain the silicon carbide powder (1).

By X-ray diffraction (XRD), a constitutional material ratio of the obtained silicon carbide powder (1) was obtained. Moreover, from this X-ray diffraction (XRD), "33.6° peak intensity" and "41.4° peak intensity" were obtained. In accordance with Equation (1) and Equation (2) described above, a stacking fault (%) of silicon carbide to be contained in the silicon carbide powder (1) was obtained. The silicon carbide powder (1) contained 77 vol % of β-SiC having a stacking fault of 0.7% (a density of 3.17 g/cm³), 13 vol % of Si (a density of 2.33 g/cm³), and 10 vol % of $NiSi_2$ (a density of 4.83 g/cm³). A crystallite size was 1000 Å or more.

In a column of "SiC (1)" of Table 1, there are shown a crystal phase of silicon carbide to be contained in the silicon carbide powder (1), a stacking fault (%) of silicon carbide to be contained in the silicon carbide powder (1), a crystallite size (Å), and an average particle diameter (him) of silicon carbide particles to be included in the silicon carbide powder (1). It is to be noted that in a column of "the crystal phase", "β" indicates that silicon carbide is β-SiC. On the other hand, in the column of "the crystal phase", "α" indicates that silicon carbide is α-SiC. Moreover, the average particle diameter of the silicon carbide particles to be included in the silicon carbide powder (1) is a value measured by the following method. First, a polished surface of an electrode section prepared by using the silicon carbide powder (1) is photographed by a scanning electron microscope (SEM). Next, the photographed cross section image is analyzed by analysis software (Image Pro (trade name) manufactured by Nihon Visual Science Co., Ltd.), and particle diameters of the silicon carbide particles to be included in the electrode section are measured. As to the particle diameters of the silicon carbide particles, 50 silicon carbide particles reflected in the cross section image are measured at random, and an average value of the measured particle diameters is obtained as the average particle diameter of the silicon carbide particles to be included in the silicon carbide powder (1).

The crystallite size is a value obtained in accordance with Equation (3). In Equation (3), when the crystallite size is 1000 Å or more, a correct value is not easily obtained sometimes. Therefore, in the silicon carbide powder (1), as described above, the crystallite size was 1000 Å or more.

(Silicon Carbide Powder (2))

The silicon carbide powder (2) (hereinafter, also referred to as "SiC (2)") was prepared by the following method. First, there were prepared 100 g of metal silicon powder having an average particle diameter of 58 μm (a density of 2.33 g/cm³), 33 g of carbon black powder having a specific surface area of 110 m²/g, 16.3 g of Zr powder having an average particle diameter of 10 μm, and 100 g of water. These materials were mixed, and mixed powder obtained by the mixing was press-formed, to prepare a formed body for the silicon carbide powder (2). Next, the obtained formed body for the silicon carbide powder (2) was dried at 100° C., to obtain a dried body for the silicon carbide powder (2). Next, the obtained dried body for the silicon carbide powder (2) was fired at 1450° C. in an argon atmosphere for two hours, to obtain a fired body for the silicon carbide powder (2). Next, the obtained fired body for the silicon carbide powder (2) was ground, to obtain the silicon carbide powder (2).

By X-ray diffraction (XRD), a constitutional material ratio of the obtained silicon carbide powder (2) was obtained. Moreover, from this X-ray diffraction (XRD), "33.6° peak intensity" and "41.4° peak intensity" were obtained. In accordance with Equation (1) and Equation (2) described above, a stacking fault (%) of silicon carbide to be contained in the silicon carbide powder (2) was obtained. The silicon carbide powder (2) contained 76 vol % of β-SiC having a stacking fault of 1.6% (a density of 3.17 g/cm³), 13 vol % of Si (a density of 2.33 g/cm³), and 11 vol % of ZrSi₂ (a density of 5.2 g/cm³). A crystallite size was 960 Å.

In a column of "SiC (2)" of Table 1, there are shown a crystal phase of silicon carbide to be contained in the silicon carbide powder (2), a stacking fault (%) of silicon carbide to be contained in the silicon carbide powder (2), a crystallite size (Å), and an average particle diameter (μm) of silicon carbide particles to be included in the silicon carbide powder (2). The average particle diameter (μm) of the silicon carbide particles to be included in the silicon carbide powder (2) is a value measured by the same method as in the silicon carbide particles to be included in the silicon carbide powder (1).

(Silicon Carbide Powder (3))

As the silicon carbide powder (3) (hereinafter, also referred to as "SiC (3)", "HSC400 (trade name)" manufactured by Superior Graphite Co. was used. By X-ray diffraction (XRD), a constitutional material ratio of the obtained silicon carbide powder (3) was obtained. Moreover, from this X-ray diffraction (XRD), "33.6° peak intensity" and "41.4° peak intensity" were obtained. In accordance with Equation (1) and Equation (2), a stacking fault (%) of silicon carbide to be contained in the silicon carbide powder (3) was obtained. The silicon carbide powder (3) contained 100 vol % of β-SiC having a stacking fault of 3.0% (a density of 3.17 g/cm³). A crystallite size was 860 Å. In a column of "SiC (3)" of Table 1, there are shown a crystal phase of silicon carbide to be contained in the silicon carbide powder (3), a crystallite size (Å), a stacking fault (%) of silicon carbide to be contained in the silicon carbide powder (3), and an average particle diameter (μm) of silicon carbide particles to be included in the silicon carbide powder (3). The crystal phase, the stacking fault (%) and the average particle diameter (μm) are values measured by the same method as in the silicon carbide particles to be included in the silicon carbide powder (1).

(Silicon Carbide Powder (4))

As the silicon carbide powder (4) (hereinafter, also referred to as "SiC (4)"), "GP240 (trade name)" manufactured by Shinano Electric Refining Co., Ltd. was used. The silicon carbide powder (4) included particles made of α-SiC (a density of 3.17 g/cm³). In a column of "SiC (4)" of Table 1, there are shown a crystal phase of silicon carbide to be contained in the silicon carbide powder (4), and an average particle diameter (μm) of silicon carbide particles to be included in the silicon carbide powder (4). The crystal phase and the average particle diameter (μm) are values measured by the same method as in the silicon carbide particles to be included in the silicon carbide powder (1).

(Silicon Carbide Powder (5))

The silicon carbide powder (5) (hereinafter, also referred to as "SiC (5)") was prepared by the following method. First, there were prepared 100 g of metal silicon powder having an average particle diameter of 58 μm (a density of 2.33 g/cm³), 33 g of carbon black powder having a specific surface area of 110 m²/g, and 100 g of water. These materials were mixed, and mixed powder obtained by the mixing was press-formed, to prepare a formed body for the silicon carbide powder (5). Next, the obtained formed body for the silicon carbide powder (5) was dried at 100° C., to obtain a dried body for the silicon carbide powder (5). Next, the obtained dried body for the silicon carbide powder (5) was fired at 1450° C. in an argon atmosphere for two hours, to obtain a fired body for the silicon carbide powder (5). Next, the obtained fired body for the silicon carbide powder (5) was ground, to obtain the silicon carbide powder (5).

By X-ray diffraction (XRD), a constitutional material ratio of the obtained silicon carbide powder (5) was obtained. Moreover, from this X-ray diffraction (XRD), "33.5° peak intensity" and "41.4° peak intensity" were obtained. In accordance with Equation (1) and Equation (2), a stacking fault (%) of silicon carbide to be contained in the silicon carbide powder (5) was obtained. The silicon carbide powder (5) contained 78 vol % of β-SiC having a stacking fault of 4.5% (a density of 3.17 g/cm³), and 22 vol % of Si (a density of 2.33 g/cm³). A crystallite size was 780 Å.

In a column of "SiC (5)" of Table 1, there are shown a crystal phase of silicon carbide to be contained in the silicon carbide powder (5), a stacking fault (%) of silicon carbide to be contained in the silicon carbide powder (5), a crystallite size (Å), and an average particle diameter (μm) of silicon carbide particles to be included in the silicon carbide powder (5). The average particle diameter (μm) of the silicon carbide particles to be included in the silicon carbide powder (5) is a value measured by the same method as in the silicon carbide particles to be included in the silicon carbide powder (1).

TABLE 1

| Type of silicon carbide | Crystal phase | stacking fault (%) | Ave. particle dia. (μm) | Crystallite size (Å) |
|---|---|---|---|---|
| SiC(1) | β | 0.7 | 26 | >1000 |
| SiC(2) | β | 1.6 | 23 | 960 |
| SiC(3) | β | 3.0 | 19 | 860 |
| SiC(4) | α | — | 56 | — |
| SiC(5) | β | 4.5 | 28 | 780 |

Example 1

Silicon carbide powder (1) (i.e., SiC (1) in Table 1), metal silicon powder, cordierite powder as oxide particles, methylcellulose, glycerin, a polyacrylic dispersant and water were mixed by a planetary centrifugal mixer, to prepare an electrode section forming raw material.

88 g of the silicon carbide powder (1) was used. As the metal silicon powder, 12 g of metal silicon powder having an average particle diameter of 5 μm and a density of 2.33 g/cm³ was used. As the cordierite powder, 4.3 g of cordierite powder having an average particle diameter of 2 μm and a density of 2.65 g/cm³ was used. Furthermore, an amount of methylcellulose to be used was 0.8 g, an amount of glycerin to be used was 9 g, and an amount of the polyacrylic dispersant to be used was 0.1 g. Furthermore, an amount of the water as a dispersion medium to be used was 40 g.

Furthermore, a honeycomb forming raw material for preparing a honeycomb structure body was prepared. The honeycomb forming raw material was prepared by mixing 6 kg of metal silicon powder of 5 μm, 14 kg of silicon carbide powder of 30 μm, 1 kg of cordierite powder, 1.6 kg of methylcellulose, and 8 kg of water, followed by kneading with a kneader.

Next, the obtained honeycomb forming raw material was vacuum-kneaded to obtain a kneaded material, and the obtained kneaded material was extruded into a honeycomb form, to obtain a honeycomb formed body. Next, the obtained honeycomb formed body was dried at 120° C., to obtain a dried honeycomb body. Next, the electrode section forming raw material prepared in advance was applied to the side surface of the obtained dried honeycomb body, and dried at 80° C., to obtain the dried honeycomb body with the electrode section forming raw material. The dried honeycomb body with the electrode section forming raw material was degreased, fired, and subjected to an oxygenation treatment, to prepare a honeycomb structure. The degreasing was performed at 450° C. in the atmospheric air for five hours. The firing was performed at 1450° C. in an argon atmosphere for two hours. The oxygenation treatment was performed at 1200° C. in the atmospheric air for five hours.

In the honeycomb structure body of the obtained honeycomb structure, a thickness of partition walls was 101.6 μm, and a cell density was 93 cells/cm$^2$. Furthermore, a diameter of each end surface of the honeycomb structure body was 100 mm, and a length in a cell extending direction was 100 mm.

In a "type and blend ratio of silicon carbide" column of Table 2, there are shown a type and a blend ratio of the silicon carbide powder used in the electrode section forming raw material. Here, "a blend prescription of silicon carbide" of Example 1 is "A". In a "blend prescription of silicon carbide" column in Table 2, respective blend prescriptions of the silicon carbide powder used in the electrode section forming raw material are shown as A to L. This "blend prescription of silicon carbide" corresponds to a "blend prescription of silicon carbide" column of Table 3. In a "total percentage of silicon carbide" column of Table 2, there is shown a percentage of a volume of silicon carbide, when a total volume of the volume of silicon carbide and a volume of a binding material (silicon and metal silicide) is 100%. In a "ratio of SiC (1) and (2)" column of Table 2, there is shown a ratio (percentage) of a total volume of β-SiC to be contained in the silicon carbide powder (1) and β-SiC to be contained in the silicon carbide powder (2), to a volume of all the silicon carbide powder used in the electrode section forming raw material. β-SiC to be contained in the silicon carbide powder (1) and β-SiC to be contained in the silicon carbide powder (2) are silicon carbide powder made of "β-SiC having a stacking fault of 2% or less".

In columns of "a blend prescription" and "a total percentage" of silicon carbide of Table 3, there are shown respective blend prescriptions of silicon carbide powder used in an electrode section forming raw material, and a percentage of a volume of silicon carbide, when a total volume of the volume of silicon carbide and a volume of a binding material (silicon and a metal silicide) is 100%. In a "percentage of silicon" column of Table 3, there is shown a percentage of a volume of silicon, when the total volume of the volume of silicon carbide and the volume of the binding material (silicon and the metal silicide) is 100%. "type" column of the metal silicide of Table there is shown a type of the metal silicide to be contained in the binding material constituting electrode sections. In a "percentage" column of the metal silicide of Table 3, there is shown a percentage of a volume of the metal silicide, when the total volume of the volume of silicon carbide and the volume of the binding material (silicon and the metal silicide) is 100%. In a "percentage of the binding material" column of Table 3, there is shown a percentage of a volume of the binding material, when the total volume of the volume of silicon carbide and the volume of the binding material (silicon and the metal silicide) is 100%. In a "type" column of an oxide of Table 3, a type of oxide particles included in the electrode section forming raw material is shown. It is to be noted that an oxide A in Table 3 is "MgO—Al$_2$O$_3$—SiO$_2$". That is, it is described that this oxide A is cordierite containing three components of MgO, Al$_2$O$_3$, and SiO$_2$. It is to be noted that an oxide B in Table 3 is "SrO—Al$_2$O$_3$—SiO$_2$". In a column of "parts by volume" of the oxide of Table 3, there is shown a content ratio (parts by volume) when the total volume of silicon carbide and the binding material is 100 parts by volume.

TABLE 2

| | Blend prescription of silicon carbide | Type and blend ratio of silicon carbide powder | | | | | total percentage of silicon carbide | Ratio of SiC (1) and (2) |
|---|---|---|---|---|---|---|---|---|
| | | SiC(1) | SiC(2) | SiC(3) | SiC(4) | SiC(5) | | |
| Example 1 | A | 65% | — | — | — | — | 65% | 100% |
| Example 2 | B | 50% | — | — | 15% | — | 65% | 77% |
| Example 3 | C | 40% | — | — | 25% | — | 65% | 62% |
| Example 4 | D | 30% | — | — | 35% | — | 65% | 47% |
| Example 5 | E | 20% | — | — | 45% | — | 65% | 31% |
| Example 6 | F | 40% | — | 25% | — | — | 65% | 62% |
| Example 7 | G | 50% | — | — | — | — | 50% | 100% |
| Example 8 | H | 50% | — | — | 25% | — | 75% | 66% |
| Example 9 | A | 65% | — | — | — | — | 65% | 100% |
| Example 10 | A | 65% | — | — | — | — | 65% | 100% |
| Example 11 | A | 65% | — | — | — | — | 65% | 100% |
| Example 12 | A | 65% | — | — | — | — | 65% | 100% |
| Example 13 | I | — | 65% | — | — | — | 65% | 100% |
| Comparative Example 1 | J | — | — | 65% | — | — | 65% | 0% |
| Comparative Example 2 | K | — | — | — | 65% | — | 65% | 0% |
| Comparative Example 3 | L | — | — | — | — | 65% | 65% | 0% |

TABLE 3

| | Silicon carbide | | Binding material | | | Oxide | |
|---|---|---|---|---|---|---|---|
| | Blend prescription of silicon carbide | total percentage | Percentage of silicon | Metal silicide Type | Percentage | total percentage | Type | Parts by volume |
| Example 1 | A | 65% | 27% | $NiSi_2$ | 8% | 35% | Oxide A | 5% |
| Example 2 | B | 65% | 29% | $NiSi_2$ | 6% | 35% | Oxide A | 5% |
| Example 3 | C | 65% | 30% | $NiSi_2$ | 5% | 35% | Oxide A | 5% |
| Example 4 | D | 65% | 31% | $NiSi_2$ | 4% | 35% | Oxide A | 5% |
| Example 5 | E | 65% | 33% | $NiSi_2$ | 2% | 35% | Oxide A | 5% |
| Example 6 | F | 65% | 30% | $NiSi_2$ | 5% | 35% | Oxide A | 5% |
| Example 7 | G | 50% | 44% | $NiSi_2$ | 6% | 50% | Oxide A | 5% |
| Example 8 | H | 75% | 19% | $NiSi_2$ | 6% | 25% | Oxide A | 5% |
| Example 9 | A | 65% | 27% | $NiSi_2$ | 8% | 35% | — | |
| Example 10 | A | 65% | 27% | $NiSi_2$ | 8% | 35% | Oxide A | 2% |
| Example 11 | A | 65% | 27% | $NiSi_2$ | 8% | 35% | Oxide A | 10% |
| Example 12 | A | 65% | 27% | $NiSi_2$ | 8% | 35% | Oxide B | 2% |
| Example 13 | I | 65% | 25% | $ZrSi_2$ | 10% | 35% | Oxide A | 5% |
| Comparative Example 1 | J | 65% | 27% | $NiSi_2$ | 8% | 35% | Oxide A | 5% |
| Comparative Example 2 | K | 65% | 27% | $NiSi_2$ | 8% | 35% | Oxide A | 5% |
| Comparative Example 3 | L | 65% | 27% | $NiSi_2$ | 8% | 35% | Oxide A | 5% |

*1: The oxide A is $MgO—Al_2O_3—SiO_2$.
*2: The oxide B is $SrO—Al_2O_3—SiO_2$.

Moreover, in Table 4, there is shown an amount of impurities in silicon (silicon powder) used in the respective example and comparative examples. It is to be noted that in Table 4, a ratio (at %) of an atomic number of the impurities to an atomic number of silicon is shown.

TABLE 4

| Amount of impurities in silicon | |
|---|---|
| Fe | 0.22 at % |
| Al | 0.31 at % |
| Ca | 0.04 at % |
| Ti | 0.02 at % |
| P | 0.004 at % |
| B | 0.005 at % |

Example 2

In Example 2, the procedures of Example 1 were repeated except that as an electrode section forming raw material, 68 g of silicon carbide powder (1), 16 g of silicon carbide powder (4), 16 g of metal silicon powder and 4.3 g of cordierite powder were used, to prepare a honeycomb structure. An average particle diameter of the metal silicon powder was 5 μm, and a density thereof was 2.33 g/cm³. An average particle diameter of the cordierite powder was 2 μm, and a density thereof was 2.65 g/cm³.

Example 3

In Example 3, the procedures of Example 1 were repeated except that as an electrode section forming raw material, 55 g of silicon carbide powder (1), 26 g of silicon carbide powder (4), 18 g of metal silicon powder and 4.3 g of cordierite powder were used, to prepare a honeycomb structure. An average particle diameter of the metal silicon powder was 5 μm, and a density thereof was 2.33 g/cm³. An average particle diameter of the cordierite powder was 2 μm, and a density thereof was 2.65 g/cm³.

Example 4

In Example 4, the procedures of Example 1 were repeated except that as an electrode section forming raw material, 42 g of silicon carbide powder (1), 37 g of silicon carbide powder (4), 20 g of metal silicon powder and 4.4 g of cordierite powder were used, to prepare a honeycomb structure. An average particle diameter of the metal silicon powder was 5 μm, and a density thereof was 2.33 g/cm³. An average particle diameter of the cordierite powder was 2 μm, and a density thereof was 2.65 g/cm³.

Example 5

In Example 5, the procedures of Example 1 were repeated except that as an electrode section forming raw material, 28 g of silicon carbide powder (1), 48 g of silicon carbide powder (4), 23 g of metal silicon powder and 4.4 g of cordierite powder were used, to prepare a honeycomb structure. An average particle diameter of the metal silicon powder was 5 μm, and a density thereof was 2.33 g/cm³. An average particle diameter of the cordierite powder was 2 μm, and a density thereof was 2.65 g/cm³.

Example 6

In Example 6, the procedures of Example 1 were repeated except that as an electrode section forming raw material, 55 g of silicon carbide powder (1), 26 g of silicon carbide powder (3), 18 g of metal silicon powder and 4.3 g of cordierite powder were used, to prepare a honeycomb structure. An average particle diameter of the metal silicon powder was 5 m, and a density thereof was 2.33 g/cm³. An average particle diameter of the cordierite powder was 2 μm, and a density thereof was 2.65 g/cm³.

Example 7

In Example 7, the procedures of Example 1 were repeated except that as an electrode section forming raw material, 72 g of silicon carbide powder (1), 28 g of metal silicon powder and 4.5 g of cordierite powder were used, to prepare a honeycomb structure. An average particle diameter of the metal silicon powder was 5 μm, and a density thereof was 2.33 g/cm³. An average particle diameter of the cordierite powder was 2 μm, and a density thereof was 2.55 g/cm³.

Example 8

In Example 8, the procedures of Example 1 were repeated except that as an electrode section forming raw material, 67 g of silicon carbide powder (1), 26 g of silicon carbide powder (4), 8 g of metal silicon powder and 4.2 g of cordierite powder were used, to prepare a honeycomb structure. An average particle diameter of the metal silicon powder was 5 μm, and a density thereof was 2.33 g/cm³. An average particle diameter of the cordierite powder was 2 μl, and a density thereof was 2.65 g/cm³.

Example 9

In Example 9, the procedures of Example 1 were repeated except that as an electrode section forming raw material, 88 g of silicon carbide powder (1) and 12 g of metal silicon powder were used, to prepare a honeycomb structure. In Example 9, any cordierite powder was not used. An average particle diameter of the metal silicon powder was 5 μm, and a density thereof was 2.33 g/cm³.

Example 10

In Example 10, the procedures of Example 1 were repeated except that as an electrode section forming raw material, 88 g of silicon carbide powder (1), 12 g of metal silicon powder and 1.7 g of cordierite powder were used, to prepare a honeycomb structure. An average particle diameter of the metal silicon powder was 5 μm, and a density thereof was 2.33 g/cm³. An average particle diameter of the cordierite powder was 2 μm and a density thereof was 2.65 g/cm³.

Example 11

In Example 11, the procedures of Example 1 were repeated except that as an electrode section forming raw material, 88 g of silicon carbide powder (1), 12 g of metal silicon powder and 8.5 g of cordierite powder were used, to prepare a honeycomb structure. An average particle diameter of the metal silicon powder was 5 μm, and a density thereof was 2.33 g/cm³. An average particle diameter of the cordierite powder was 2 μm, and a density thereof was 2.65 g/cm³.

Example 12

In Example 12, the procedures of Example 1 were repeated except that as an electrode section forming raw material, 88 g of silicon carbide powder (1), 12 g of metal silicon powder, 0.9 g of $SrCO_3$ powder, 0.4 g of $Al(OH)_3$ powder and 2.2 g of silica sol were used, to prepare a honeycomb structure. An average particle diameter of the metal silicon powder was 5 μm and a density thereof was 2.33 g/cm³. An average particle diameter of the $SrCO_3$ powder was 1 μm. An average particle diameter of the $Al(OH)_3$ powder was 3 μm. As the silica sol, silica sol having a solid content concentration of 40% was used. In Example 12, $SrO-Al_2O_3-SiO_2$ ("Oxide B" in Table 3) was generated as an oxide in electrode sections. A density of this $SrO-Al_2O_3-SiO_2$ was 2.83 g/cm³.

Example 13

In Example 13, the procedures of Example 1 were repeated except that as an electrode section forming raw material, 89 g of silicon carbide powder (2), 11 g of metal silicon powder and 4.1 g of cordierite powder were used, to prepare a honeycomb structure. An average particle diameter of the metal silicon powder was 5 μl, and a density thereof was 2.33 g/cm³. An average particle diameter of the cordierite powder was 2 μm, and a density thereof was 2.65 g/cm³.

Comparative Example 1

In Comparative Example 1, the procedures of Example 1 were repeated except that as an electrode section forming raw material, 67 g of silicon carbide powder (3), 26 g of metal silicon powder, 6 g of Ni powder and 4.3 g of cordierite powder were used, to prepare a honeycomb structure. A density of the silicon carbide powder (3) was 3.17 g/cm³. An average particle diameter of the metal silicon powder was 5 μm, and a density thereof was 2.33 g/cm³. An average particle diameter of the cordierite powder was 2 μm, and a density thereof was 2.65 g/cm³. An average particle diameter of the Ni powder was 0.8 μm.

Comparative Example 2

In Comparative Example 2, the procedures of Example 1 were repeated except that as an electrode section forming raw material, 67 g of silicon carbide powder (4), 26 g of metal silicon powder, 6 g of Ni powder and 4.3 g of cordierite powder were used, to prepare a honeycomb structure. A density of the silicon carbide powder (4) was 3.17 g/cm³. An average particle diameter of the metal silicon powder was 5 μm, and a density thereof was 2.33 g/cm³. An average particle diameter of the cordierite powder was 2 μm, and a density thereof was 2.65 g/cm³. An average particle diameter of the Ni powder was 0.8 μm.

Comparative Example 3

In Comparative Example 3, the procedures of Example 1 were repeated except that as an electrode section forming raw material, 81 g of silicon carbide powder (5), 12 g of metal silicon powder, 6 g of Ni powder and 4.3 g of cordierite powder were used, to prepare a honeycomb structure. An average particle diameter of the metal silicon powder was 5 μm, and a density thereof was 2.33 g/cm³. An average particle diameter of the cordierite powder was 2 μm, and a density thereof was 2.65 g/cm³. An average particle diameter of the Ni powder was 0.8 μm.

As to Examples 2 to 13 and Comparative Examples 1 to 3, "the blend prescription of silicon carbide", "the type and blend ratio of silicon carbide", "the total percentage of silicon carbide" and "the ratio of SiC (1) and (2)" are shown in Table 2. Moreover, as to Examples 2 to 13 and Comparative Examples 1 to 3, "the blend prescription" and "the total percentage" of silicon carbide, "the percentage of silicon", "the type" and "the percentage" of the metal silicide, "the percentage of the binding material" and "the type" and "the percentage" of the oxide are shown in Table 3.

Furthermore, as to the honeycomb structures of Examples 1 to 13 and Comparative Examples 1 to 3, a porosity (%) of each electrode section, a thickness (μm) of the electrode section and an electrical resistivity (Ωcm) of the electrode section were measured by the following methods. Results are shown in Table 5.

TABLE 5

| | Electrode section | | |
|---|---|---|---|
| | Porosity (%) | Thickness (μm) | Electrical resistivity (Ω · cm) |
| Example 1 | 46 | 150 | 0.06 |
| Example 2 | 43 | 150 | 0.11 |
| Example 3 | 42 | 150 | 0.17 |
| Example 4 | 41 | 150 | 0.27 |
| Example 5 | 41 | 150 | 0.50 |
| Example 6 | 49 | 150 | 0.20 |
| Example 7 | 42 | 150 | 0.04 |
| Example 8 | 44 | 150 | 0.25 |
| Example 9 | 55 | 150 | 0.21 |
| Example 10 | 52 | 150 | 0.16 |
| Example 11 | 38 | 150 | 0.05 |
| Example 12 | 48 | 150 | 0.10 |
| Example 13 | 48 | 150 | 0.15 |
| Comparative Example 1 | 49 | 150 | 1.7 |
| Comparative Example 2 | 40 | 150 | 1.7 |
| Comparative Example 3 | 45 | 150 | 1.7 |

(Porosity (%) of Electrode Section)

The porosity of the electrode section was calculated and obtained by image analysis of an image obtained by a scanning electron microscope (SEM).

(Thickness (μm) of Electrode Section)

A thickness of the electrode section was measured by the image analysis of the image obtained by the scanning electron microscope (SEM).

(Electrical Resistivity (Ωcm) of Electrode Section)

Each electrode section of each obtained honeycomb structure was cut out to prepare a measurement sample, and an electrical resistivity of the measurement sample was measured at room temperature by a four-terminals method.

CONCLUSION

As shown in Table 5, in each of the honeycomb structures of Examples 1 to 13, the electrical resistivity of each electrode section was low. On the other hand, it has been found that in the honeycomb structures of Comparative Examples 1 to 3, the porosity (%) and thickness (μm) of each electrode section had the same degrees as in the honeycomb structures of Examples 1 to 13, but the electrical resistivity of the electrode section was high. That is, it has been found that by use of an aggregate containing silicon carbide made of "β-SiC having a stacking fault of 2% or less", the electrical resistivity of the electrode section lowers. It is to be noted that in the honeycomb structures of Examples 1 to 13 and Comparative Examples 1 to 3, the electrical resistivity of each honeycomb structure body at 400° C. was 40 Ωcm. As a result of quantitative analysis of each of the electrode sections of the honeycomb structures of Examples 1 to 13 and Comparative Examples 1 to 3 by an X-ray diffraction method (XRD), there were obtained the same results as in the total percentage of silicon carbide, the percentage of silicon, the total percentage of the binding material and parts by volume of the oxide shown in Table 2. The quantitative analysis of the electrode section by the XRD was performed by fitting, by a WPPD method, an XRD pattern measured by the X-ray diffraction method (XRD). Furthermore, also as to the volume percentage of β-SiC having the stacking fault of 2% or less, there were obtained the same results as the results shown in Table 1, after the quantitative analysis from the electrode section by the XRD.

Hereinafter, the results shown in Table 5 will be considered for each of the examples and comparative examples. (1) In Example 1, in contrast to Comparative Examples 1 and 2, the silicon carbide powder (1) having less stacking fault (i.e., SiC (1)) was used, and hence the electrical resistivity of the electrode section was low. (2 to 4) In Example 2, in contrast to Example 1, the silicon carbide powder (4) made of α-SiC (i.e., SiC (4)) was mixed, which heightened the electrical resistivity of the electrode section. Therefore, it is seen that the silicon carbide powder (1) having less stacking fault contributes to the decrease of the electrical resistivity. Also in Examples 3 and 4, the electrical resistivity of the electrode section was high due to the increase of the silicon carbide powder (4). (5) In Example 5, as compared with Comparative Examples 1 to 3, the electrical resistivity of the electrode section was low, but the percentage of the silicon carbide powder (1) was 40% or less, and as compared with the other examples, the electrical resistivity of the electrode section was high. (6) In Example 6, in contrast to Example 3, the silicon carbide powder (4) having a small average particle diameter was used. As a result, the electrode section had a high porosity, and the electrical resistivity thereof was high. (7) In Example 7, in contrast to Example 1, the percentage of the binding material was increased. As a result, in contrast to Example 1, the electrical resistivity was low. (8) In Example 8, in contrast to Example 3, the percentage of the binding material was decreased. As a result, in contrast to Example 3, the electrical resistivity was high. (9) In Example 9, in contrast to Example 1, any oxides were not added. As a result, as compared with Example 1, the porosity was high, and the electrical resistivity was high.

(10) In Example 10, in contrast to Example 1, the amount of the oxide was decreased. As a result, as compared with Example 1, the porosity was high, and the electrical resistivity was high. (11) In Example 11, in contrast to Example 1, the amount of the oxide was increased. As a result, the porosity of the electrode section was low, but as compared with Example 1, the electrical resistivity hardly lowered. (12) In Example 12, in contrast to Example 10, SrO was used as the raw material of the oxide. As a result, the porosity was low, and the electrical resistivity was also low. (13) In Example 13, in contrast to Example 1, the silicon carbide powder (2) having more stacking fault (i.e., SiC (2)) was used. As a result, as compared with Example 1, the electrical resistivity of the electrode section was high. Therefore, it is seen that the amount of the stacking fault of β-SiC constituting the silicon carbide powder influences the electrical resistivity of the electrode section. (14) In Comparative Example 1, in contrast to Example 1, the silicon carbide powder (3) having the stacking fault of 2% or more (i.e., SiC (3)) was used. As a result, as compared with Example 1, the electrical resistivity of the electrode section was very high. (15) In Comparative Example 2, in contrast to Example 1, the silicon carbide powder (4) made of α-SiC (i.e., SiC (4)) was used. As a result, as compared with Example 1, the electrical resistivity of the electrode section was very high. (16) In Comparative Example 3, in contrast to Example 1, the silicon carbide powder (5) having the stacking fault of 2% or more (i.e., SiC (5)) was used. As a result, as compared with Example 1, the electrical resistivity of the electrode section was very high.

A honeycomb structure of the present invention can suitably be utilized as a catalyst carrier for an exhaust gas purifying device which purifies an exhaust gas of a car.

DESCRIPTION OF REFERENCE SYMBOLS

1: partition wall, 2: cell, 3: outer peripheral wall, 4: honeycomb structure body, 5: side surface, 11: first end surface, 12: second end surface, 21: electrode section, 100 and 200: honeycomb structure, O: center, α: central angle, β: angle formed by line segment P and line segment Q, P: line segment connecting a center point of one electrode section to the center of the honeycomb structure body, Q: line segment connecting a center point of the other electrode section to the center of the honeycomb structure body, and θ: angle of 0.5 times the central angle.

What is claimed is:

1. A honeycomb structure comprising:
   a tubular honeycomb structure body having porous partition walls to define and form a plurality of cells as through channels of a fluid which extend from a first end surface as one end surface to a second end surface as the other end surface, and an outer peripheral wall positioned on the outermost periphery; and
   a pair of electrode sections disposed on a side surface of the tubular honeycomb structure body,
   wherein an electrical resistivity of the tubular honeycomb structure body is from 1 to 200 Ωcm,
   each of the pair of electrode sections is formed into a band shape extending in an extending direction of the plurality of cells of the tubular honeycomb structure body,
   in a cross section perpendicular to the extending direction of the plurality of cells, one electrode section in the pair of electrode sections is disposed on a side opposite to the other electrode section in the pair of electrode sections via the center of the tubular honeycomb structure body,
   each of the pair of electrode sections comprises a porous body in which particles made of silicon carbide as an aggregate are bound by a binding material,
   silicon carbide as the aggregate constituting each of the pair of electrode sections contains β-SiC having a stacking fault of 2% or less, and
   the binding material constituting each of the pair of electrode sections contains silicon and a metal silicide.

2. The honeycomb structure according to claim 1, wherein a crystallite size of the β-SiC is 900 Å or more.

3. The honeycomb structure according to claim 1,
   wherein silicon carbide as the aggregate contains 40 vol % or more of β-SiC having the stacking fault of 2% or less.

4. The honeycomb structure according to claim 1, wherein a ratio of a volume of the binding material to a volume of silicon carbide as the aggregate is from 20/80 to 60/40.

5. The honeycomb structure according to claim 1,
   wherein an average particle diameter of the particles made of silicon carbide as the aggregate is from 10 to 70 μm.

6. The honeycomb structure according to claim 1,
   wherein the metal silicide to be contained in the binding material is a metal silicide of at least one selected from the group consisting of nickel and zirconium.

7. The honeycomb structure according to claim 1,
   wherein a ratio of a volume of the metal silicide to a total volume of silicon carbide as the aggregate and the binding material is from 1 to 10 vol %.

8. The honeycomb structure according to claim 1,
   wherein each of the pair of electrode sections further contains an alkaline earth metal oxide, $Al_2O_3$, and $SiO_2$.

9. The honeycomb structure according to claim 8, wherein the alkaline earth metal oxide is MgO.

10. The honeycomb structure according to claim 8,
    wherein each of the pair of electrode sections contains the alkaline earth metal oxide, $Al_2O_3$, and $SiO_2$ as much as 1 to 10 parts by volume in total, when a total volume of silicon carbide as the aggregate and the binding material is 100 parts by volume.

11. The honeycomb structure according to claim 1,
    wherein a thickness of each of the pair of electrode sections is from 50 to 300 μm.

12. The honeycomb structure according to claim 1,
    wherein a porosity of each of the pair of electrode sections is from 10 to 60%.

13. The honeycomb structure according to claim 1,
    wherein β-SiC having the stacking fault of 2% or less which is to be contained in silicon carbide as the aggregate is obtained by using silicon, a carbonaceous substance, and a transition metal to form the silicon into silicon carbide.

14. A manufacturing method of a honeycomb structure comprising:
    an electrode section forming step of applying an electrode section forming raw material to each of a first region and a second region of a side surface of a tubular honeycomb formed body having partition walls to define and form a plurality of cells as through channels of a fluid which extend from a first end surface as one end surface to a second end surface as the other end surface, and an outer peripheral wall positioned on the outermost periphery, or a fired honeycomb body obtained by firing the honeycomb formed body, and drying and firing the applied electrode section forming raw material, to form a pair of electrode sections,
    wherein in the electrode section forming step, the electrode section forming raw material is applied so that in a cross section perpendicular to an extending direction of the cells of the honeycomb formed body or the fired honeycomb body, the first region is positioned on a side opposite to the second region via the center of the honeycomb formed body or the fired honeycomb body, and the first and second regions are formed in a band shape extending in an extending direction of the plurality of cells of the honeycomb formed body or the fired honeycomb body,
    the electrode section forming raw material includes particles made of silicon carbide as an aggregate and a metal silicide as a binding material, and particles made of silicon which becomes a binding material, and silicon carbide as the aggregate contains β-SiC having a stacking fault of 2% or less, and
    wherein an electrical resistivity of the fired honeycomb body is 1 to 200 Ωcm.

15. The manufacturing method of the honeycomb structure according to claim 14,
    wherein β-SiC having the stacking fault of 2% or less which is to be contained in silicon carbide as the aggregate is obtained by using an aggregate material including silicon, a carbonaceous substance, and a transition metal.

16. The manufacturing method of the honeycomb structure according to claim 15,
    wherein the carbonaceous substance to be included in the aggregate material is carbon black.

17. The manufacturing method of the honeycomb structure according to claim 15,
    wherein the transition metal to be included in the aggregate material is at least one selected from the group consisting of nickel and zirconium.

18. The manufacturing method of the honeycomb structure according to claim 15,
    wherein the silicon to be included in the aggregate material is a particulate material having an average particle diameter of 50 μm or more.

* * * * *